US011910153B2

(12) United States Patent
Corynen et al.

(10) Patent No.: US 11,910,153 B2
(45) Date of Patent: Feb. 20, 2024

(54) DIPOLE LOUDSPEAKER FOR PRODUCING SOUND AT BASS FREQUENCIES

(71) Applicant: PSS BELGIUM NV, Dendermonde (BE)

(72) Inventors: David Corynen, Dendermonde (BE); Fabian Vuine, Dendermonde (BE)

(73) Assignee: PSS BELGIUM NV, Dendermonde (BE)

( * ) Notice: Subject to any disclaimer, the term of this patent is extended or adjusted under 35 U.S.C. 154(b) by 51 days.

(21) Appl. No.: 17/612,268

(22) PCT Filed: May 19, 2020

(86) PCT No.: PCT/EP2020/064003
§ 371 (c)(1),
(2) Date: Nov. 18, 2021

(87) PCT Pub. No.: WO2020/234317
PCT Pub. Date: Nov. 26, 2020

(65) Prior Publication Data

US 2022/0210543 A1 Jun. 30, 2022

(30) Foreign Application Priority Data

May 23, 2019 (GB) ..................................... 1907267
Jun. 14, 2019 (GB) ..................................... 1908551

(51) Int. Cl.
*H04R 1/28* (2006.01)
*H04R 1/02* (2006.01)
(Continued)

(52) U.S. Cl.
CPC ........... *H04R 1/2819* (2013.01); *H04R 1/028* (2013.01); *H04R 1/06* (2013.01); *H04R 1/288* (2013.01);
(Continued)

(58) Field of Classification Search
None
See application file for complete search history.

(56) References Cited

U.S. PATENT DOCUMENTS 4,100,992 A 7/1978 Rehde et al.
4,582,163 A 4/1986 Catthoor
(Continued)

FOREIGN PATENT DOCUMENTS

CN 1390431 A 1/2003
CN 102187688 A 9/2011
(Continued)

OTHER PUBLICATIONS

ISA/EP, International Search Report and Written Opinion for corresponding PCT Patent Application No. PCT/EP2020/064003, dated Jul. 10, 2020, 9 pages.
(Continued)

*Primary Examiner* — Walter F Briney, III
(74) *Attorney, Agent, or Firm* — NK Patent Law

(57) ABSTRACT

A dipole loudspeaker for producing sound at bass frequencies. The dipole loudspeaker includes: a diaphragm having a first radiating surface and a second radiating surface, wherein the first radiating surface and the second radiating surface are located on opposite faces of the diaphragm; a drive unit configured to move the diaphragm at bass frequencies such that the first and second radiating surfaces produce sound at bass frequencies, wherein the sound produced by the first radiating surface is in antiphase with sound produced by the second radiating surface; a frame, wherein the diaphragm is suspended from the frame via one or more suspension elements, wherein the frame is configured to allow sound produced by the first radiating surface to propagate out from a first side of the dipole loudspeaker and to allow sound produced by the second radiating surface to propagate out from a second side of the dipole loudspeaker.
(Continued)

The diaphragm includes a region of porous material having a specific airflow resistance in the range 5-5000 Pa·s/m, wherein the diaphragm is configured to permit airflow through at least part of said region of porous material from the first radiating surface of the diaphragm to the second radiating surface of the diaphragm.

14 Claims, 11 Drawing Sheets

(51) Int. Cl.
*H04R 7/04* (2006.01)
*H04R 7/18* (2006.01)
*H04R 9/06* (2006.01)
*H04R 1/06* (2006.01)
*H04R 7/06* (2006.01)

(52) U.S. Cl.
CPC ................. *H04R 7/04* (2013.01); *H04R 7/06* (2013.01); *H04R 7/18* (2013.01); *H04R 9/06* (2013.01); *H04R 2307/00* (2013.01); *H04R 2400/11* (2013.01)

(56) References Cited

U.S. PATENT DOCUMENTS

| | | | | |
|---|---|---|---|---|
| 2002/0018576 | A1* | 2/2002 | Shima | H04R 1/025 381/396 |
| 2005/0111688 | A1 | 5/2005 | Wilmink et al. | |
| 2005/0201583 | A1 | 9/2005 | Colich | |
| 2006/0198541 | A1 | 9/2006 | Henry | |
| 2008/0247595 | A1 | 10/2008 | Henry | |
| 2015/0208175 | A1 | 7/2015 | Pinkerton | |
| 2018/0279027 | A1 | 9/2018 | Wayne, Jr. | |
| 2018/0295449 | A1 | 10/2018 | Morgan | |
| 2019/0281390 | A1* | 9/2019 | Guo | H04R 7/20 |

FOREIGN PATENT DOCUMENTS

| | | | | | |
|---|---|---|---|---|---|
| CN | 105230046 | A | | 1/2016 | |
| CN | 108632724 | A | | 10/2018 | |
| DE | 2829589 | A1 | | 1/1980 | |
| DE | 3221414 | A1 | | 12/1983 | |
| DE | 202013104545 | U1 | | 11/2013 | |
| DE | 202013104545 | U1 | * | 5/2014 | G10K 11/004 |
| DE | 102018213954 | A1 | * | 2/2020 | G10K 11/1783 |
| EP | 0267650 | A2 | | 5/1988 | |
| EP | 0988771 | A1 | | 3/2000 | |
| EP | 1204295 | A1 | | 5/2002 | |
| EP | 1204295 | A1 | * | 5/2002 | E04B 9/001 |
| EP | 1711031 | A1 | | 10/2006 | |
| EP | 2928207 | A1 | | 10/2015 | |
| GB | 2393602 | A | | 3/2004 | |
| JP | S5669334 | A | | 6/1981 | |
| JP | 2017022604 | A | | 1/2017 | |
| JP | 2017022604 | A | * | 1/2017 | |
| KR | 20160104500 | A | | 9/2016 | |
| WO | 9402935 | A1 | | 2/1994 | |
| WO | 9806232 | A1 | | 2/1998 | |
| WO | 9955117 | A1 | | 10/1999 | |
| WO | 0067524 | A2 | | 11/2000 | |
| WO | 03001841 | A2 | | 1/2003 | |
| WO | 2005041616 | A1 | | 5/2005 | |
| WO | 2010046132 | A1 | | 4/2010 | |
| WO | 2014165844 | A1 | | 10/2014 | |
| WO | 2010046132 | A1 | | 4/2019 | |
| WO | 2019121266 | A1 | | 6/2019 | |
| WO | 2019192808 | A1 | | 10/2019 | |
| WO | 2019192816 | A1 | | 10/2019 | |
| WO | 2020126847 | A1 | | 6/2020 | |

OTHER PUBLICATIONS

ISO 9053-1: "Acoustics—Determination of airflow resistance—Part 1: Static airflow method", Oct. 2018, 14 pages.

* cited by examiner

DIPOLE LOUDSPEAKER FOR PRODUCING SOUND AT BASS FREQUENCIES

CROSS REFERENCE TO RELATED APPLICATIONS

This application is a U.S. National Stage Application of International Patent Application No. PCT/EP2020/064003 entitled "DIPOLE LOUDSPEAKER FOR PRODUCING SOUND AT BASS FREQUENCIES" filed 19 May 2020, which claims priority from United Kingdom Patent Application No. 1907267.7 entitled "LOUDSPEAKER" filed 23 May 2019 and from United Kingdom Patent Application No. 1908551.3 entitled "DIPOLE LOUDSPEAKER FOR PRODUCING SOUND AT BASS FREQUENCIES" filed 14 Jun. 2019, the entire contents and elements of all of which are herein incorporated by reference for all purposes.

FIELD OF THE INVENTION

The present invention relates to a dipole loudspeaker for producing sound at bass frequencies.

BACKGROUND

Loudspeakers for producing sound at bass frequencies are well known.

Among the frequencies in the audible spectrum, lower frequencies are the ones that tend to carry most well over larger distances and are the ones difficult to keep inside a room. For example, nuisance from neighboring loud music has mostly a low frequency spectrum. "Low" frequencies can also be referred to as "bass" frequencies and these terms may be used interchangeably throughout this document.

Many cars today are equipped with a main audio system, which typically consists of a central user interface console with internal or external audio amplifiers, and one or more loudspeakers placed in the doors. This type of audio system is used to ensure enough loudness of the same content (e.g. radio or cd-playback) for all passengers.

Some cars include personal entertainment systems (music, games & television) which are typically equipped with headphones to ensure individual passengers receive personalized sound, without disturbing (or being disturbed by) other passengers who are enjoining a different audio-visual content.

Some cars include loudspeakers placed very close to an individual passenger, so that sound having an adequately high sound pressure level ("SPL") can be obtained at the ears of that individual passenger, whilst having a much lower SPL at the positions of other passengers.

The present inventor has observed that the concept of a personal sound cocoon is a useful way to understand the approach of having a loudspeaker placed close to a user, wherein the personal sound cocoon is a region in which a user is able to experience sound having an SPL deemed to be acceptably high for their enjoyment, whereas outside the personal sound cocoon the sound is deemed to have an SPL which is lower than it is within the personal sound cocoon.

PCT/EP2018/084636, PCT/EP2019/056109 and PCT/EP2019/056352 all filed by the present applicant, are directed to loudspeakers intended for use in creating a personal sound cocoon, with an ear of a user being very close (e.g. 30 cm or less) from a diaphragm or sound outlet of the loudspeaker.

Of these earlier applications, PCT/EP2018/084636 describes a dipole loudspeaker configured to allow sound produced by the first radiating surface to propagate out from a first side of the dipole loudspeaker and to allow sound produced by the second radiating surface to propagate out from a second side of the dipole loudspeaker. PCT/EP2019/056109 describes an array of multiple dipole loudspeakers being used together in a particular way to form a "multipole" loudspeaker unit.

More recently filed GB1907267.7 describes a dipole loudspeaker including a frame, wherein a proximal end of a diaphragm is suspended from the frame by at least one proximal suspension element, wherein the at least one proximal suspension element is configured to substantially prevent translational movement of the proximal end of the diaphragm relative to the frame, whilst permitting translational movement of a distal end of the diaphragm which is opposite to the proximal end of the diaphragm. This "hinged" or "cantilever" arrangement is useful to reduce rub and buzz harmonic distortion, when located close to an ear of a user.

In practice, the bass loudspeakers of PCT/EP2018/084636, PCT/EP2019/056109, PCT/EP2019/056352, and GB1907267.7 are preferably combined with a mid-high frequency loudspeaker, to enable sound reproduction over a complete audio bandwidth.

However, packaging a mid-high frequency loudspeaker in combination with a bass loudspeaker is challenging in a limited space such as a seat headrest, especially when it is considered that the diaphragm of the bass loudspeaker(s) need to have a large radiating surface to permit enough volume displacement for adequate low frequency reproduction, as explained for example in PCT/EP2018/084636.

In general, bass loudspeakers use a solid, non-porous diaphragm, to provide the large volume displacements required for bass sound reproduction.

However, the present inventors have observed that a solid non-porous diaphragm has little ability to absorb sound. Thus, when such a diaphragm is used in close proximity to a mid-high frequency loudspeaker, the solid non-porous diaphragm behaves like a reflective surface, scattering the arriving soundwaves at mid-high frequencies back into the local environment, hence jeopardizing a personal sound cocoon at mid and high frequencies.

With a view to solving this problem, the present inventors considered the possibility of covering a solid non-porous diaphragm of a bass loudspeaker with a layer of absorbent material (e.g. a porous foam). However, the absorption provided by such a layer of absorbent material is limited by the available thickness of the layer, yet in most cases (and particularly if a loudspeaker is to be mounted in close proximity to an ear of a user) it is inconvenient to apply a layer of absorbent material having a large thickness to the outer surface of the solid non-porous diaphragm, due to the lack of available space. So in practice, the method of covering a solid non-porous diaphragm of a bass loudspeaker with a layer of absorbent material may only help to absorb sound energy at mid-high frequencies in a very limited way, e.g. at very high frequencies only.

For loudspeakers which are to be incorporated into a headrest, the space availability in a headrest is limited and in many cases is shared with other equipment (e.g. height adjustment mechanism), so the present inventors have observed that careful integration of silent operating loudspeakers capable of moving adequate volumes of air is required.

PCT/EP2019/084950 describes an inertial exciter that could be used to drive a dipole loudspeaker.

The present invention has been devised in light of the above considerations.

SUMMARY OF THE INVENTION

A first aspect of the present invention provides:

A dipole loudspeaker for producing sound at bass frequencies, the dipole loudspeaker including:

a diaphragm having a first radiating surface and a second radiating surface, wherein the first radiating surface and the second radiating surface are located on opposite faces of the diaphragm;

a drive unit configured to move the diaphragm at bass frequencies such that the first and second radiating surfaces produce sound at bass frequencies, wherein the sound produced by the first radiating surface is in antiphase with sound produced by the second radiating surface;

a frame, wherein the diaphragm is suspended from the frame via one or more suspension elements, wherein the frame is configured to allow sound produced by the first radiating surface to propagate out from a first side of the dipole loudspeaker and to allow sound produced by the second radiating surface to propagate out from a second side of the dipole loudspeaker;

wherein the diaphragm includes a region of porous material having a specific airflow resistance in the range 5-5000 Pa·s/m, wherein the diaphragm is configured to permit airflow through at least part of said region of porous material from the first radiating surface of the diaphragm to the second radiating surface of the diaphragm.

The present inventors have observed that configuring the diaphragm to permit airflow through at least part of a region of porous material having a specific airflow resistance in the stated range helps the dipole loudspeaker to produce sound at bass frequencies with a similar performance to a non-porous diaphragm.

The diaphragm of such a dipole loudspeaker cam also exhibit excellent sound absorption qualities for mid and high frequencies, since the (at least part of) the region of porous material through which air can flow will allow mid and high frequencies to pass through, thereby allowing for much more friction at the velocity maxima of these sound waves. This is in contrast with a diaphragm having a non-porous reflective surface covered with a layer porous material of the same thickness.

Note that when such a dipole loudspeaker is used in close proximity to an ear of the user, the (at least part of) the region of porous material through which air can flow will sound more quiet to the user in the mid and high frequencies due to the improved absorption of mid and high frequencies, thus making the loudspeaker particularly useful for creating a personal sound cocoon.

Also, such a dipole loudspeaker can beneficially be used in a configuration in which a mid-high frequency loudspeaker, e.g. with the mid-high frequency loudspeaker located behind the (at least part of) the region of porous material through which air can flow, thereby improving packaging options. This possibility is discussed in more detail below.

For the purpose of this invention, a porous material can be understood as any material that allows airflow therethrough.

The specific airflow resistance of the region of porous material may be measured in accordance with ISO 9053, e.g. as discussed below (under "Airflow resistance measurements").

A dipole loudspeaker according to the first aspect of the invention may be configured for use with an ear of a user located at a listening position that is in front of and 50 cm or less (more preferably 40 cm or less, more preferably 30 cm or less, more preferably 25 cm or less, more preferably 20 cm or less, more preferably 15 cm or less) from the first radiating surface of the diaphragm.

For reasons explained in PCT/EP2018/084636 and PCT/EP2019/056109, if sound produced by the first and second radiating surfaces of the loudspeaker is able to propagate out from the loudspeaker, then a user with an ear that is in front of and close to (e.g. 50 cm or less from) a first radiating surface of the diaphragm will preferably hear the sound produced by that first radiating surface, but a user who is further away from that first radiating surface will preferably hear sound with a greatly reduced SPL level at low frequencies, it is believed due to interference from out of phase sound produced by the second radiating surface of the diaphragm. Thus, in such a configuration, a user is able to experience an effective personal sound cocoon at low frequencies.

Here it is to be noted that although the listening position has been defined with respect to the first radiating surface of the diaphragm, this does not rule out the possibility of a similar "proximity" effect being achievable at another listening position. Indeed, it is expected that a similar effect could be achieved with respect to the second radiating surface of the diaphragm.

Preferably, the region of porous material has a specific airflow resistance in the range 5-5000 Pa·s/m, more preferably 10-1000 Pa·s/m, more preferably 50-500 Pa·s/m. Such ranges, particularly 50-500 Pa·s/m, have been found to be particularly useful in achieving the advantages noted above.

As can be seen from the experiments discussed below, a specific airflow resistance of at least 50 Pa·s/m is preferred to generate bass frequency sounds having a large SPL, though useful levels of SPL may be achieved with a specific flow resistance of as low as 10 Pa·s/m, or even 5 Pa·s/m.

As can also be seen from the experiments discussed below, a specific flow resistance of less than 500 Pa·s/m is preferred to avoid the region of porous material reflecting a large proportion of sound in mid-high frequencies, though the region of porous material may still allow absorption of a useful proportion of sound in mid-high frequencies with a specific flow resistance as high as 1000 Pa·s/m, or even 5000 Pa·s/m. Here it is noted that for absorbing sound effectively at mid and high frequencies, one can look for an optimal combination of flow resistivity and thickness for a same specific flow resistance. The effectiveness of sound absorption will depend on the combination of the parameters r, Rs and t (see FIG. 10A below).

The diaphragm may include a layer of porous material. The layer may be mounted on a supporting structure or unsupported. The region of porous material may be the entirety of, or a part of, the layer of porous material.

The diaphragm may include a layer of porous material mounted on a supporting structure.

The region of porous material may be the entirety of, or a part of, the layer of porous material (mounted on the supporting structure). The diaphragm may be configured to permit airflow through at least part of said region of porous material (from the first radiating surface of the diaphragm to the second radiating surface of the diaphragm) by the supporting structure including one or more holes/cut-outs which are configured to permit airflow through at least part of said region of porous material.

If the diaphragm includes a layer of porous material mounted on a supporting structure, the face of the diaphragm on which the layer of porous material is mounted preferably provides the first radiating surface of the diaphragm, and the opposite face of the diaphragm preferably provides the second radiating surface of the diaphragm. Thus, if the dipole loudspeaker is configured for use with an ear of a user located at a listening position that is in front of the first radiating surface of the diaphragm (see above), the face of the diaphragm on which the layer of porous material is mounted preferably faces the ear of the user. This helps to maximise the effectiveness of the personal sound cocoon provided to the user in the mid-high frequency range.

The supporting structure is preferably rigid.

The supporting structure may be a perforated sheet of non-porous material, wherein the sheet includes a plurality of holes/cut-outs. The perforated sheet is preferably rigid.

Conveniently, a voice coil of the drive unit may be mounted on the supporting structure, e.g. via a voice coil former attached to the supporting structure.

Conveniently, a lead wire configured to supply electrical energy to a voice coil of the drive unit may be mounted to (e.g. attached to) the supporting structure.

Preferably, the region of porous material is the entirety of the layer of porous material (mounted on the supporting structure), and the diaphragm is configured to permit airflow through the entire region of porous material (from the first radiating surface of the diaphragm to the second radiating surface of the diaphragm) by the supporting structure including one or more holes/cut-outs which are configured to permit airflow through the entire region of porous material. This may be achieved by the supporting structure being a perforated sheet of non-porous material, wherein the perforated sheet has an adequately large coverage of perforations such that its specific airflow resistance is effectively zero.

An adequately large coverage of perforations may equate to the plurality of holes/cut-outs having an area that is at least 30%, more preferably at least 40%, more preferably 50% or more of the area of the sheet when the holes/perforations are covered. Preferably such holes/perforations are reasonably distributed across the surface of the plate, see e.g. experiment 1 and FIG. 6A discussed below.

However, embodiments are conceivable in which the region of porous material is only a part of the layer of porous material (i.e. only a part of the layer of porous material has the required specific airflow resistance), and/or the supporting structure only includes one or more holes/cut-outs which are configured to permit airflow through one or more parts of the region of porous material, see e.g. experiment 3 and FIG. 8A discussed below.

A comparison of the perforated plates used in experiments 1 and 3 discussed below shows that a good result can be obtained with a variety of sizes/shapes/distributions of holes/perforations.

In some embodiments, the diaphragm may be an unsupported layer of porous material, e.g. having a rigidity such that it can be used a diaphragm without the need to be mounted on a supporting structure. In this case, the region of porous material may be the unsupported layer of porous material (or part of the unsupported layer of porous material) that is used as the diaphragm.

The dipole loudspeaker may include:

a supplementary loudspeaker configured to produce sound which propagates through the at least part of said region of porous material (i.e. the at least part of said region of porous material that the diaphragm is configured to permit airflow through).

Preferably, a principal radiating axis of the supplementary loudspeaker extends through the at least part of said region of porous material (i.e. the at least part of said region of porous material that the diaphragm is configured to permit airflow through).

A principal radiating axis of a loudspeaker may be defined as an axis along which the loudspeaker produces direct sound at maximum amplitude (sound pressure level). A loudspeaker having a principle radiating axis may be referred to as a directional loudspeaker. Bass loudspeakers are typically of limited directionality, but mid-high frequency loudspeakers are typically directional.

The supplementary loudspeaker is preferably a mid-high frequency loudspeaker configured to produce sound across at least the range 500 Hz-10 kHz, more preferably across at least the range 300 Hz-15 kHz, more preferably across at least the range 300 Hz-20 kHz, or even across the range 100 Hz-20 kHz.

The supplementary loudspeaker could however have a more limited range, or there could be multiple supplementary loudspeakers covering the mid-high frequency range.

The drive unit may be an electromagnetic drive unit that includes a magnet unit configured to produce a magnetic field in an air gap, and a voice coil attached to the diaphragm (typically via an intermediary coupling element, such as a voice coil former). In use, the voice coil may be energized (have a current passed through it) to produce a magnetic field which interacts with the magnetic field produced by the magnet unit and which causes the voice coil (and therefore the diaphragm) to move relative to the magnet unit. The magnet unit may include a permanent magnet. The voice coil may be configured to sit in the air gap when the diaphragm is at rest. Such drive units are well known.

The drive unit configured to move the diaphragm at bass frequencies is preferably rigidly attached to the frame of the dipole loudspeaker (unlike, for example, the inertial exciters described in PCT/EP2019/084950). The frame of the dipole loudspeaker may be rigidly attached to a frame of an application (e.g. a seat headrest), but could also be suspended from a frame of an application e.g. by a suspension tuned to have a resonant frequency below that of the frequency of operation of the dipole loudspeaker (as in the example shown in FIG. 4B, below).

In a second aspect, the present invention may provide a seat assembly including a seat and a dipole loudspeaker according to the first aspect of the invention.

Preferably, the seat is configured to position a user who is sat down in the seat such that an ear of the user is located at a listening position as described above, e.g. a listening position that is in front of and 50 cm or less (more preferably 40 cm or less, more preferably 30 cm or less, more preferably 25 cm or less, more preferably 20 cm or less, more preferably 15 cm or less) from the first radiating surface of the diaphragm.

The dipole loudspeaker may be mounted within a headrest of the seat ("seat headrest"). Since a typical headrest is configured to be a small distance (e.g. 30 cm or less) from the ears of a user who is sat down in a seat, this is a particularly convenient way of configuring the seat to position a user who is sat down in the seat such that an ear of the user is located at a listening position as described above.

The headrest of the seat may include a rear portion, configured to be located behind a head of a user sat in the seat, when the seat is in use.

The headrest of the seat may include a wing portion, configured to extend at least partially along a side of a head of a user sat in the seat, when the seat is in use.

The diaphragm may extend at least partially into the wing portion. The distal end of the diaphragm may be located in the wing portion.

The headrest may include a headrest material which at least partially encloses the dipole loudspeaker. If the headrest includes two dipole loudspeakers according to the first aspect of the invention (see below), the headrest material may at least partially enclose both dipole loudspeakers.

The headrest material which encloses the dipole loudspeaker is preferably a porous material, and has a specific airflow resistance of less than 25 Pa·s/m (e.g. has a resistivity and thickness that results in a specific airflow resistance of less than 25 Pa·s/m, see equation 4 discussed below).

The headrest material which encloses the dipole loudspeaker may be covered by a finishing material which preferably has a specific airflow resistance of less than 25 Pa·s/m (e.g. has a resistivity and thickness that results in a specific airflow resistance of less than 25 Pa·s/m, see equation 4 discussed below).

The diaphragm may be curved, e.g. so as to follow a curvature of a user-facing surface of the headrest.

The headrest of the seat may include a first wing portion configured to extend at least partially along a first side of a head of a user sat in the seat, and a second wing portion configured to extend at least partially along a second side of the head of the user sat in the seat, when the seat is in use.

The headrest may include two dipole loudspeakers according to the first aspect of the invention.

The seat may be configured to position a user who is sat down in the seat such that a first ear of the user is located at a listening position that is in front of and 50 cm or less (more preferably 40 cm or less, more preferably 30 cm or less, more preferably 25 cm or less, more preferably 20 cm or less, more preferably 15 cm or less) from the first radiating surface of the diaphragm of a first of the two dipole loudspeakers, and such that a second ear of the user is located at a listening position that is in front of and 50 cm or less (more preferably 40 cm or less, more preferably 30 cm or less, more preferably 25 cm or less, more preferably 20 cm or less, more preferably 15 cm or less) from the first radiating surface of the diaphragm of a second of the two dipole loudspeakers.

The diaphragm of a first of the two dipole loudspeakers may extend at least partially into the first wing portion, and the diaphragm of a second of the two dipole loudspeakers may extend at least partially into the second wing portion.

The seat may have a rigid seat frame. The frame of the dipole loudspeaker may be part of or fixedly attached to the rigid seat frame.

The seat may be a vehicle seat, for use in a vehicle such as a car ("car seat") or an aeroplane ("plane seat").

The seat could be a seat for use outside of a vehicle. For example, the seat could be a seat for a computer game player, a seat for use in studio monitoring or home entertainment.

In a third aspect, the present invention may provide a vehicle (e.g. a car or an aeroplane) having a plurality of seat assemblies according to the second aspect of the invention.

The invention includes the combination of the aspects and preferred features described except where such a combination is clearly impermissible or expressly avoided.

SUMMARY OF THE FIGURES

Embodiments and experiments illustrating the principles of the invention will now be discussed with reference to the accompanying figures in which.

DETAILED DESCRIPTION OF THE INVENTION

Aspects and embodiments of the present invention will now be discussed with reference to the accompanying figures. Further aspects and embodiments will be apparent to those skilled in the art. All documents mentioned in this text are incorporated herein by reference.

Figure 1A:
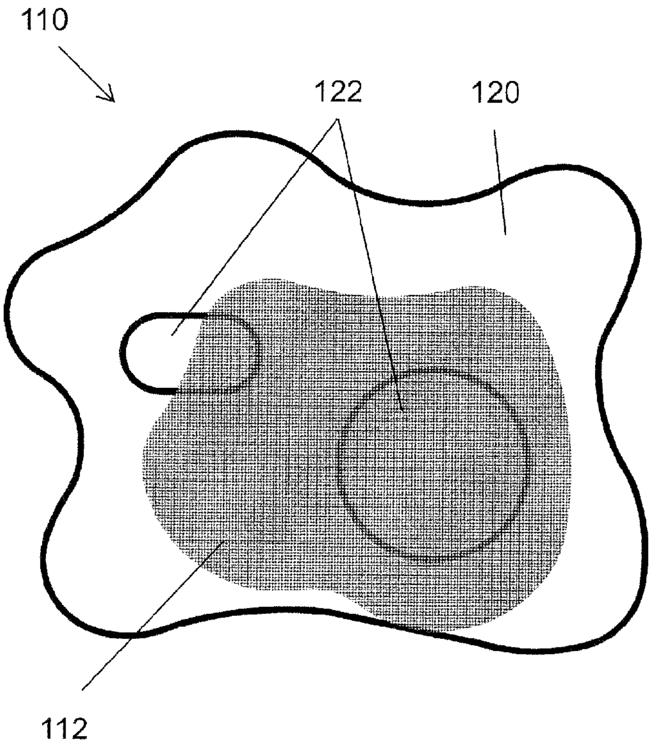
FIGS. 1A-1C show a first diaphragm illustrating the principles of the present invention.
Figure 1B:
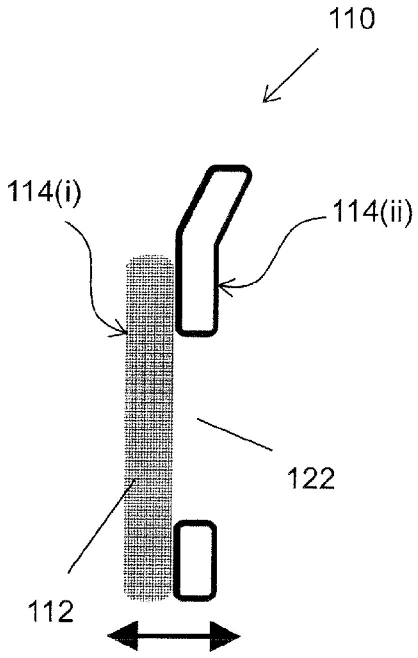
Figure 1C:
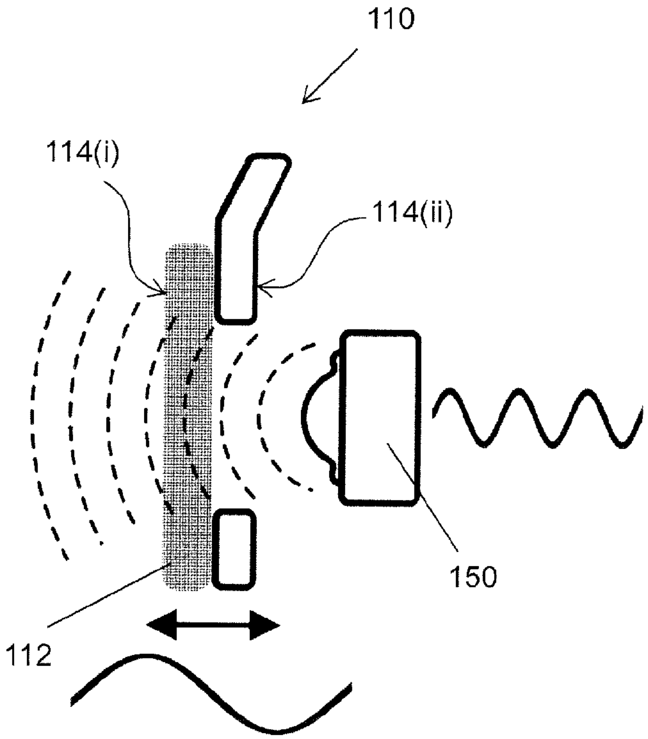

FIGS. 1A-1C show a first diaphragm 110 illustrating the principles of the present invention.

In this example, the diaphragm 110 includes a layer 112 of porous material mounted on a supporting structure 120. The porous material may be an open cell foam or other porous material such as a textile, for example.

Here, the layer 112 of porous material is only shown as covering part of the supporting structure 120.

Preferably, the thickness and porosity of the layer 112 of porous material is chosen such that the layer 112 of porous material has a specific airflow resistance in the range 5-5000 Pa·s/m, more preferably in the range 50-500 Pa·s/m.

Thus, in this example, the entirety of the layer 112 of porous material has a specific airflow resistance in the range 5-5000 Pa·s/m, more preferably in the range 50-500 Pa·s/m.

In this example, the supporting structure 120 is a perforated sheet of non-porous material, wherein the sheet has an arbitrary shape and includes an arbitrary number of holes/cut-outs of arbitrary shape, in this case two holes 122.

In this example, the holes 122 in the perforated sheet 120 permit airflow through part of the region of porous material. Specifically, the holes 122 in the perforated sheet permit airflow through the parts of the region of porous material that are located over the holes. Thus, the diaphragm is configured to permit airflow through said parts of the region of porous material from a first radiating surface 114(*i*) of the diaphragm to a second radiating surface 114(*ii*) of the diaphragm 110.

A skilled person would appreciate that the perforated sheet 120 could have any shape and any number or shape of perforations to achieve a required openness or structural performance. Similarly, the layer 112 of porous material could have a required porosity and/or thickness such that the layer 112 of porous material has a specific airflow resistance in a desired range.

FIG. 1C shows the first diaphragm 110, wherein a supplementary loudspeaker 150 is configured to produce sound which propagates through one of the holes 122 in the perforated sheet, and therefore through one of the parts of the layer 112 of porous material that the diaphragm is configured to permit airflow through. The supplementary loudspeaker is preferably a mid-high frequency loudspeaker.

This configuration is able to work since mid-high frequency sound is able to pass through the layer 112 of porous material via the holes 122 with relatively little attenuation (see experiments discussed below). A skilled person would appreciate there is a balance in setting the specific airflow resistance of the layer 112 so as to not overly attenuating mid-high frequency sound, whilst still generating bass frequencies with an adequate SPL.

Figure 2A:
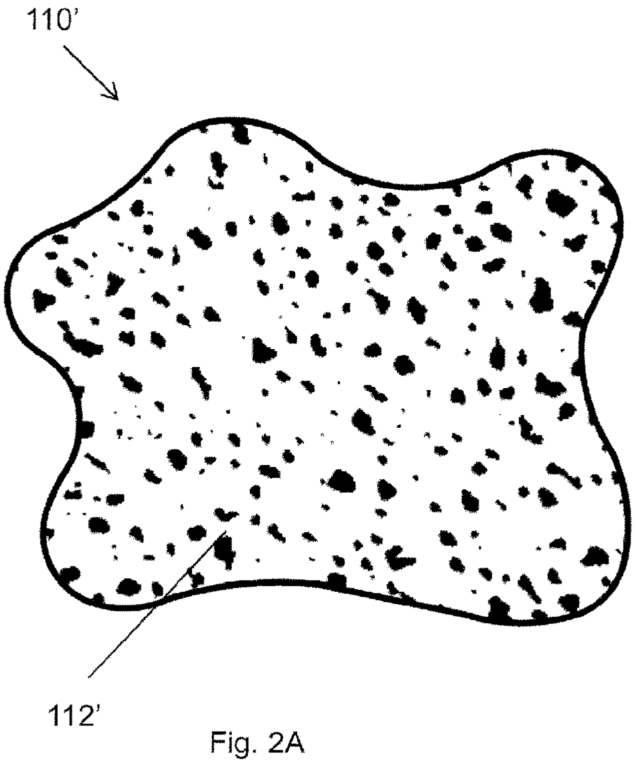
FIGS. 2A-2B show a second diaphragm illustrating the principles of the present invention.
Figure 2B:
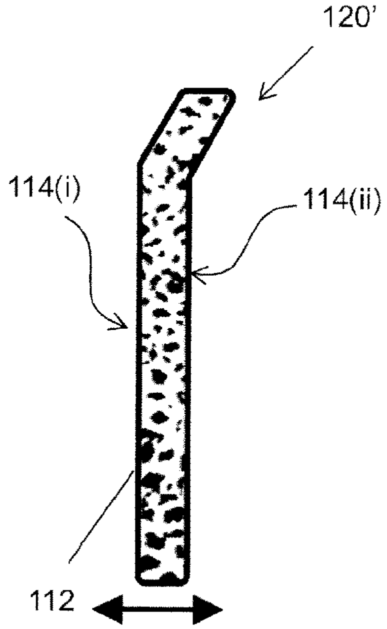

FIGS. 2A-2B show a second diaphragm 110' illustrating the principles of the present invention.

Alike features corresponding to features described in relation to previous drawings have been given alike reference numerals.

In this example, the diaphragm is an unsupported layer 112' of porous material. That is, the porous material forming the layer 112' and the thickness of the layer 112' are chosen such that the layer 112' can be used as a diaphragm without the need to be mounted on a supporting structure.

Moreover, the porous material forming the layer 112', and the thickness of the layer 112' are chosen such that the layer 112' has a specific airflow resistance in the range 5-5000 Pa·s/m, more preferably in the range 50-500 Pa·s/m.

Thus, in this example, the entirety of the layer 112' of porous material can be viewed as a region of porous material having a specific airflow resistance in the range 5-5000 Pa·s/m, more preferably in the range 50-500 Pa·s/m.

The material used for the layer 112' may be foamed silica, foamed aluminium, or any other porous solid having the required properties.

Figure 3:
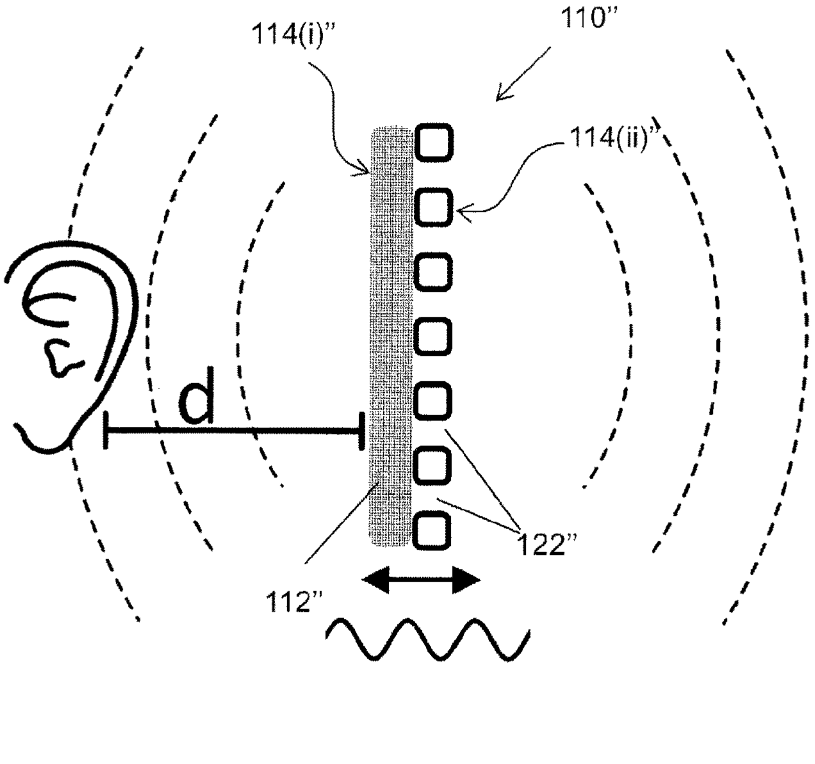
FIG. 3 shows a third diaphragm illustrating the principles of the present invention.

FIG. 3 shows a third diaphragm 110" illustrating the principles of the present invention.

Again, alike features corresponding to features described in relation to previous drawings have been given alike reference numerals.

In this example, the layer 112" of porous material is mounted on a perforated sheet 120" having an adequately large coverage of perforations such that its specific airflow resistance is effectively zero.

Thus, the holes 122" in the perforated sheet 120" permit airflow through the entire layer 112" of porous material from a first radiating surface 114(*i*)" of the diaphragm to a second radiating surface 114(*ii*)" of the diaphragm 110".

Again, the thickness and porosity of the layer 112" of porous material is preferably chosen such that the layer 112" of porous material has a specific airflow resistance in the range 5-5000 Pa·s/m, more preferably in the range 50-500 Pa·s/m.

Thus, in this example, the entirety of the layer 112" of porous material can be viewed as a region of porous material having a specific airflow resistance in the range 5-5000 Pa·s/m, more preferably in the range 50-500 Pa·s/m.

FIG. 3 shows the diaphragm 110" being moved at bass frequencies such that the first and second radiating surfaces 114(*i*)", 114(*ii*)" produce sound at bass frequencies, wherein the sound produced by the first radiating surface 114(*i*)" is in antiphase with sound produced by the second radiating surface 114(*ii*)" (this is inherently true for all diaphragms). In order to be used as a dipole loudspeaker, the diaphragm 110" should be suspended from a frame (not shown) so that sound produced by the first radiating surface 114(*i*)" is able to propagates out from a first side of the dipole loudspeaker and so that sound produced by the second radiating surface 114(*ii*)" propagates out from a second side of the dipole loudspeaker.

As is also shown in FIG. 3, a dipole loudspeaker including the third diaphragm 110" may be configured for use with an ear of a user located at a listening position that is in front of and a distance d (e.g. 30 cm or less) from the first radiating surface of the diaphragm.

Figure 4A:
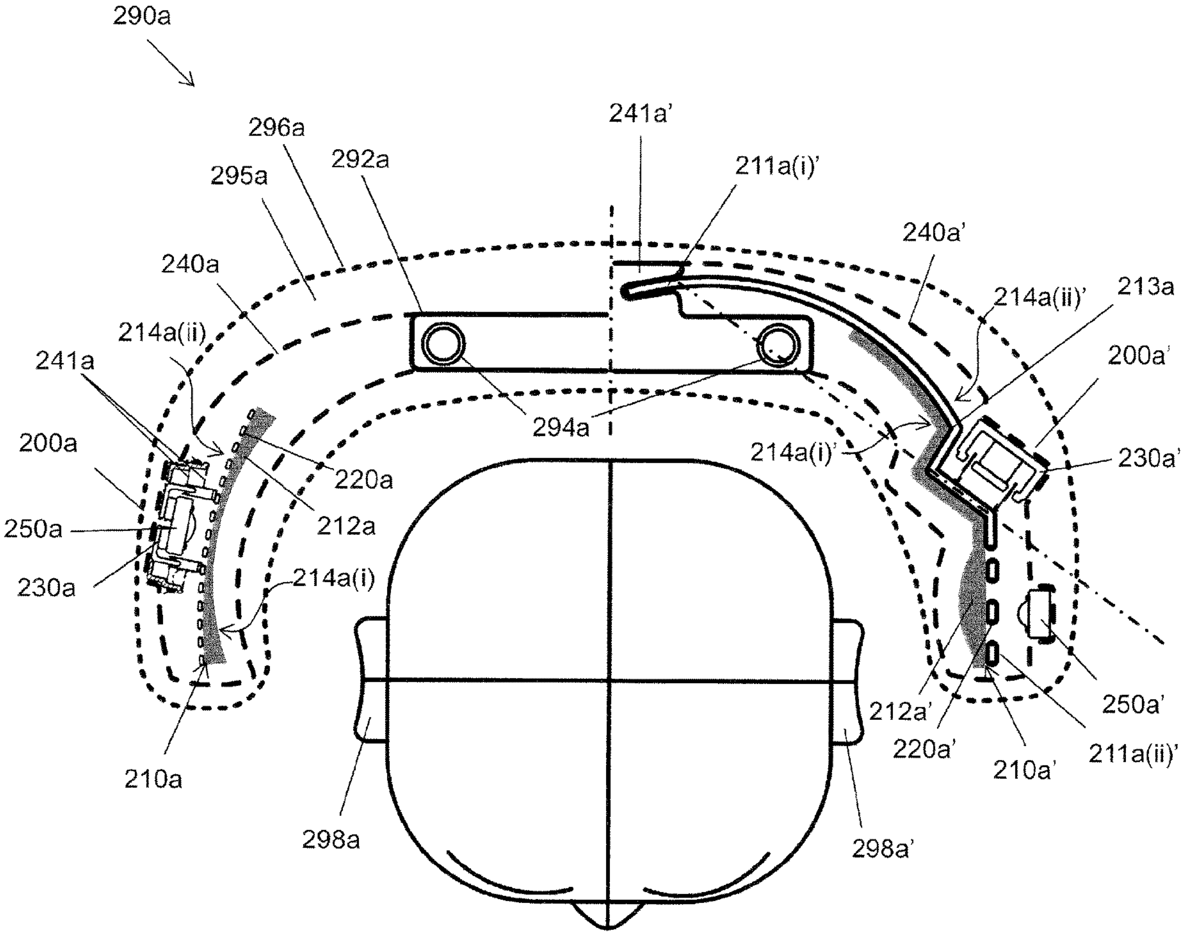
FIG. 4A shows a first seat headrest in which two dipole loudspeakers according to the present invention are mounted.

FIG. 4A shows a seat headrest 290*a* (in this example, a car seat headrest) in which a first dipole loudspeaker 200*a* according to the present invention is mounted and a second dipole loudspeaker 200*a*' according to the present invention is mounted.

Both loudspeakers 200*a*, 200*a*' are bass loudspeakers for producing sound at bass frequencies.

In this example, the two dipole loudspeakers 200*a*, 200*a*' have different structures so as to illustrate different possibilities, though in most cases it is envisaged that both dipole loudspeakers included in the seat headrest 290*a* would have the same structure as each other.

The seat headrest 290*a* includes headrest material 295*a* which encloses the first and second dipole loudspeakers 200*a*, 200*a'*.

In this example, the headrest material 295*a* includes a porous foam material having an open cell structure providing comfort (such as reticulated polyurethane ("PU"), polyethylene ("PE") or polyester foam) and a specific airflow resistance of less than 25 Pa·s/m, which is itself covered by a finishing material 296*a* (such as a textile or perforated leather) having a specific airflow resistance of less than 25 Pa·s/m. Note: the low specific airflow resistances of the headrest material and finishing material are chosen so as to avoid bass frequencies being impeded from propagating out of the seat headrest 290*a*.

Each dipole loudspeaker 200*a*, 200*a*' includes a drive unit 230*a* 230*a*' configured to move a diaphragm 210*a*, 210*a*' at bass frequencies such that first and second radiating surfaces 214*a*(*i*), 214*a*(*i*)', 214*a*(*ii*), 214*a*(*ii*)' produce sound at bass frequencies, wherein the sound produced by the first radiating surface 214*a*(*i*), 214*a*(*i*)' is in antiphase with sound produced by the second radiating surface 214*a*(*ii*), 214*a*(*ii*)'. Each drive unit 230*a*, 230*a*' shown here is an electromagnetic drive unit.

The seat (not shown) is configured to position a user who is sat down in the seat such that a first ear 298*a* of the user is located at a listening position that is in front of and 30 cm or less from the first radiating surface 214*a*(*i*) of the diaphragm 210*a* of the first dipole loudspeaker 200*a*, and such that a second ear 298*a*' of the user is located at a listening position that is in front of and 30 cm or less from the first radiating surface 214*a*(*i*)' of the diaphragm 210*a*' of the second dipole loudspeaker 200*a'*.

Each dipole loudspeaker 200*a*, 200*a*' also includes a frame 240*a*, 240*a*', wherein the diaphragm 210*a*, 210*a*' is suspended from the frame 240*a*, 240*a*' via one or more suspension elements 241*a*, 241*a*' wherein the frame 240*a*, 240*a*' is configured to allow sound produced by the first radiating surface 214*a*(*i*), 214*a*(*i*)' to propagate out from a first side of the dipole loudspeaker 200*a*, 200*a*' and to allow sound produced by the second radiating surface 214*a*(*ii*), 214*a*(*ii*)' to propagate out from a second side of the dipole loudspeaker 200*a*, 200*a*'. Thus there is no enclosure configured to capture sound from one of the two radiating surfaces (as in a monopole loudspeaker). In this example, each frame 240*a*, 240' is a perforated frame to further help bass and mid-high frequency sound to pass therethrough substantially unimpeded.

The frame 240*a* of the first dipole loudspeaker 200*a* is fixedly attached to a frame 292*a* of the seat headrest 290*a*. The frame 292*a* of the seat headrest 290*a* is itself part of a rigid seat frame of the seat of which the seat headrest 290*a* is a part, with the frame 292*a* of the seat headrest 290*a* being rigidly connected to the remainder of the rigid seat frame via mounting pins 294*a*, 294*a'*.

The rigid seat frame can be considered the "application". Reference herein to the "application" in relation to a given loudspeaker is intended to refer to an external apparatus to which a loudspeaker described herein is attached to (preferably rigidly attached to, though this need not always be the case, see e.g. FIG. 4B discussed below).

Each dipole loudspeaker 200*a*, 200*a'* also includes a supplementary loudspeaker 250*a*, 250*b*, which is preferably a mid-high frequency loudspeaker. Thus the (composite) loudspeaker is able to produce sound over a full audio frequency range (i.e. a range that includes including bass, mid and high frequencies).

The diaphragm 210*a* of the first dipole loudspeaker 200*a* includes a layer 212*a* of porous material mounted on a supporting structure 220*a*, which in this case is a perforated sheet 220*a*, holes in which are configured to permit airflow through the entire layer 212*a* of porous material from the first radiating surface 214*a*(*i*) to the second radiating surface 214*a*(*ii*) of the diaphragm 210*a*.

In this example, the entirety of the layer 212*a* of porous material has a specific airflow resistance in the range 5-5000 Pa·s/m, more preferably in the range 50-500 Pa·s/m, and thus can be viewed as a region of porous material having a specific airflow resistance in the range 5-5000 Pa·s/m, more preferably in the range 50-500 Pa·s/m.

The drive unit 230*a* is rigidly mounted to the frame 240*a*, and has the supplementary mid-high frequency loudspeaker 250*a* mounted therein. In this case, the drive unit 230*a* and diaphragm 210*a* are essentially the same as those described with reference to FIG. 6D below, and thus does not need to be described further here.

The supplementary mid-high frequency loudspeaker 250*a* is configured to produce sound which propagates through a part of the layer 212*a* porous material that airflow is permitted to flow through.

We now move on to consider the second dipole loudspeaker 200*a'*.

In the second dipole loudspeaker 200*a'*, a proximal end 211*a*(*i*)' of the diaphragm 210*a'* is suspended from the frame 240*a'* by at least one proximal suspension element 241*a'*, which here is a rigid clamp. The rigid clamp 241*a'* is an extension of the material of the frame 292*a*. The rigid clamp 241*a'* clamps the proximal end 211*a*(*i*)' of the diaphragm 210*a'* and is configured to substantially prevent translational and rotational movement of the proximal end 211*a*(*i*)' of the diaphragm 210*a'* relative to the frame 240*a'*, whilst permitting translational movement of a distal end 211*a*(*ii*)' of the diaphragm 210*a'* which is opposite to the 211*a*(*i*)' of the diaphragm 210*a'*. The drive unit 230*a'* is configured to move the distal end 211*a*(*ii*)' of the diaphragm 210*a'*.

The diaphragm 210*a'* is thus suspended as a cantilever, and the loudspeaker 200*a'* may thus be referred to as having a "cantilever" diaphragm. Note that a local corrugation 213*a'* in the diaphragm 210*a'* is used for voice coil placement, improving packaging, and optimizing the trajectory path of the voice coil, thereby minimizing the air gap width.

If the clamp 241*a'* were configured to substantially prevent translational movement of the proximal end 211*a*(*i*)' of the diaphragm 210*a'* relative to the frame 240*a'* whilst allowing rotational movement thereof (not shown), then the diaphragm 210*a'* could be referred to as a "hinged" diaphragm.

Loudspeakers incorporating cantilever and hinged diaphragms, and the benefits thereof (e.g. reduced rub and buzz harmonic distortion), are described in more detail in GB1907267.7.

The diaphragm 210*a'* of the second dipole loudspeaker 200*a'* includes a layer 212*a'* of porous material mounted on a supporting structure 220*a'*.

In this example, the entirety of the layer 212*a'* of porous material has a specific airflow resistance in the range 5-5000 Pa·s/m, more preferably in the range 50-500 Pa·s/m, and thus can be viewed as a region of porous material having a specific airflow resistance in the range 5-5000 Pa·s/m, more preferably in the range 50-500 Pa·s/m.

In this example, the supporting structure 220*a'* is a perforated sheet. This perforated sheet 220*a'* has holes only in part of the perforated sheet 220*a'*, and thus the perforated sheet 220*a* is only configured to permit airflow through only part of the layer 212*a'* of porous material (this part being the part of the layer 212*a'* that covers the part of the perforated sheet 220*a* that includes holes, at the distal end 211*a*(*ii*)' of the diaphragm 210*a'*).

The supplementary mid-high frequency loudspeaker 250*a'* is configured to produce sound which propagates through a part of the layer 212*a'* porous material that airflow is permitted to flow through.

Figure 4B:
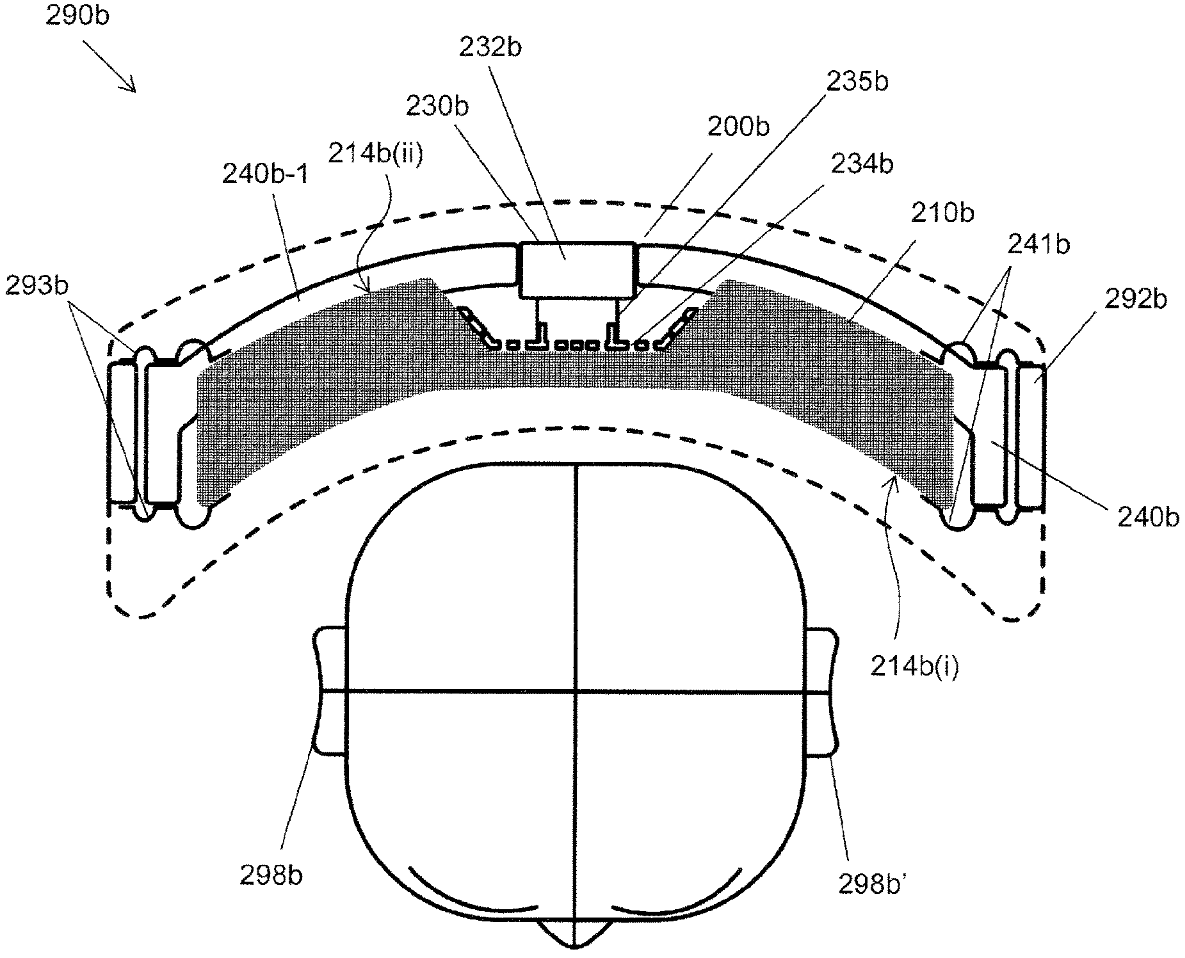
FIG. 4B shows a second seat headrest in which a dipole loudspeaker according to the present invention is mounted.

FIG. 4B shows a seat headrest 290*b* (again, in this example, a car seat headrest) in which a dipole loudspeaker 200*b* according to the present invention is mounted.

Alike features described in relation to previous drawings have been given alike reference numerals.

The second loudspeaker 200*b* incorporates some of the principles described in more detail in PCT/EP2018/084636.

Here, the diaphragm 210*b* of the loudspeaker 200*b* is suspended from the frame 240*b* of the loudspeaker 200*b* by one or more primary suspension elements 241*b* (in this case two roll suspensions), and the frame 240*b* of the loudspeaker 200*b* is suspended from the frame 292*b* of the seat headrest 290*b* by a one or more secondary suspension elements 293*b* (in this case two roll suspensions).

The drive unit 230*b* of the loudspeaker 210*b* is attached to the frame 240*b* of the loudspeaker 200*b*.

The drive unit 230*b* is an electromagnetic drive unit that includes a magnet unit 232*b* that is configured to produce a magnetic field, and a voice coil (not shown) attached to the diaphragm 210*b* via a voice coil coupler 234*b*, which includes a voice coil former 235*b*

The frame 240*b* of the dipole loudspeaker 200*b* includes rigid supporting arms 240*b*-1 configured to hold the magnet unit 232*b* in front of a second radiating surface 214*b*(*ii*) of the diaphragm 210*b*.

In this example, the voice coil coupler 234*b* is an element which attaches the voice coil to the second radiating surface 214*b*(*ii*) of the diaphragm 210*b*. In this example, the voice coil coupler 234*b* is glued to both the voice coil and the diaphragm 210*b*, and includes lots of holes to allow airflow. The voice coil coupler 234*b* may be configured to prevent the magnet unit 232*b* from passing through diaphragm 210*b* in the event of a crash. The voice coil coupler 234*b* may be made e.g. of plastic.

The one or more secondary suspension elements 293*b* are preferably tuned to have a resonant frequency below the frequency of operation of the loudspeaker dipole 200*b*, thereby helping to reduce vibrations from reaching the frame 292*b* of the seat headrest 290*b*, and thus the frame of the seat to which the frame 292*b* of the seat headrest 290*b* is rigidly attached.

In this example, the diaphragm 210*b* is an unsupported layer 212*b* of porous material. That is, the porous material forming the layer 212*b* and the thickness of the layer 212*b* are chosen such that the layer 212*b* can be used as a diaphragm without the need to be mounted on a supporting structure (hence the use of a voice coil coupler 234*b* to prevent the magnet unit 232*b* from passing through diaphragm 210*b* in the event of a crash).

Moreover, the porous material forming the layer 212*b*, and the thickness of the layer 212*b* are chosen such that the layer 212*b* has a specific airflow resistance in the range 5-5000 Pa·s/m, more preferably in the range 50-500 Pa·s/m.

Thus, in this example, the entirety of the layer 212*b* of porous material can be viewed as a region of porous material having a specific airflow resistance in the range 5-5000 Pa·s/m, more preferably in the range 50-500 Pa·s/m.

The porous material used for the layer 212*b* may be foamed silica, foamed aluminium, or any other perforated solid having the required properties.

FIGS. 5A-D show additional dipole loudspeakers 300*a-d* according to the present invention.

Each dipole loudspeaker 300*a-d* is a bass loudspeaker for producing sound at bass frequencies.

Alike features described in relation to previous drawings have been given alike reference numerals.

Each drive unit 330*a-d* includes both a magnet assembly and a coil assembly.

The magnet assembly includes a magnet unit 330*a-d* configured to provide a magnetic field in an air gap, wherein the air gap extends around a movement axis of the drive unit (wherein the drive unit is configured to move the diaphragm in a direction parallel to the movement axis).

The coil assembly includes: an attachment portion 336*a-d* which provide an attachment between the coil assembly and the diaphragm; a voice coil 337*a-d*; a voice coil former 338*a-d* which extends from the attachment portion into the air gap, wherein the voice coil is mounted to the voice coil former so that the voice coil sits in the air gap when the diaphragm 310*a-d* is at rest; a tubular member 339*a-d*, which is positioned radially outwardly of the voice coil former with respect to the movement axis, and which overlaps the voice coil former along at least a portion of the movement axis.

Each drive unit also includes two suspension elements 341*a-d* attached to the tubular member 339*a-d* and a part of the magnet assembly (in this case a frame 340*a-d* rigidly connected to the magnet unit 330*a-d*) positioned radially outwardly of the tubular member. The diaphragm 310*a-d* is thus suspended from the magnet assembly via the two suspension elements 341*a-d* and the coil assembly.

For each dipole loudspeaker 300*a-d*, the diaphragm 310*a-d* includes a layer 312*a-d* of porous material mounted on a supporting structure 320*a-d*, which in this case is a perforated sheet 320*a-d*, holes in which are configured to permit airflow through the entire layer 312*a-d* of porous material from the first radiating surface 314*a-d*(*i*) to the second radiating surface 314*a-d*(*ii*) of the diaphragm 310*a-d*.

In each example, the entirety of the layer 312*a-d* of porous material has a specific airflow resistance in the range 5-5000 Pa·s/m, more preferably in the range 50-500 Pa·s/m, and thus can be viewed as a region of porous material having a specific airflow resistance in the range 5-5000 Pa·s/m, more preferably in the range 50-500 Pa·s/m.

Figure 5A:
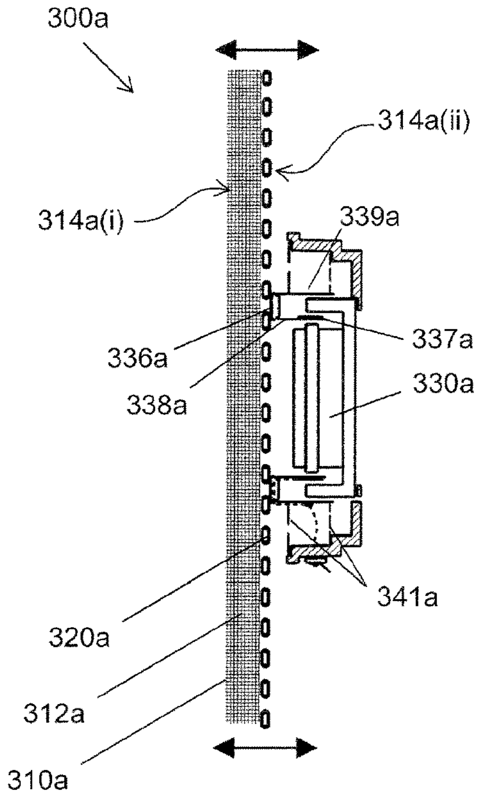
FIGS. 5A-D show additional dipole loudspeakers according to the present invention.
Figure 5B:
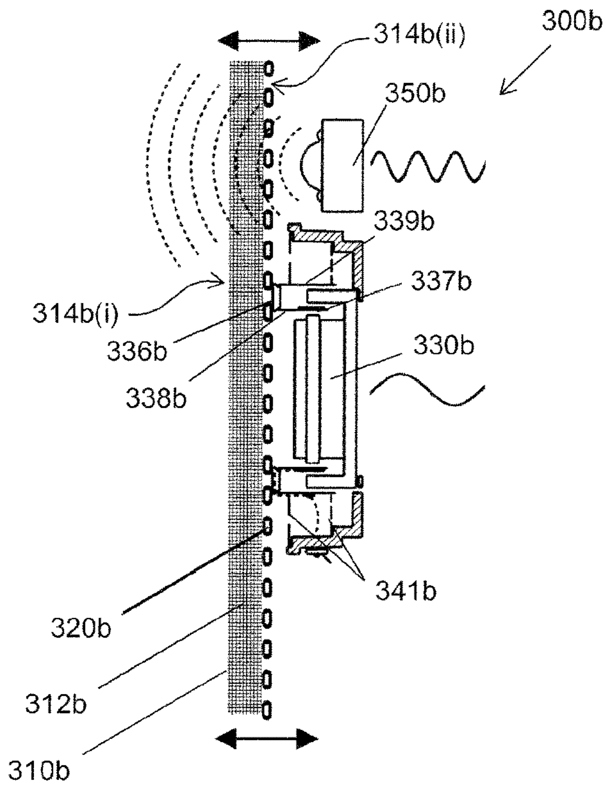
Figure 5C:
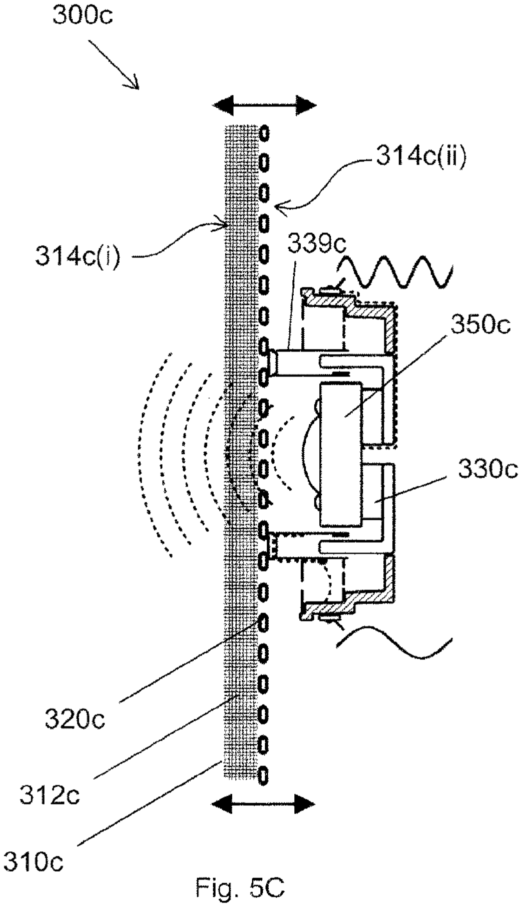

For the dipole loudspeakers 300*a-c* shown in FIGS. 5A-C, the diaphragm is planar and the layer 312*a-c* of porous material has a uniform thickness.

Figure 5D:
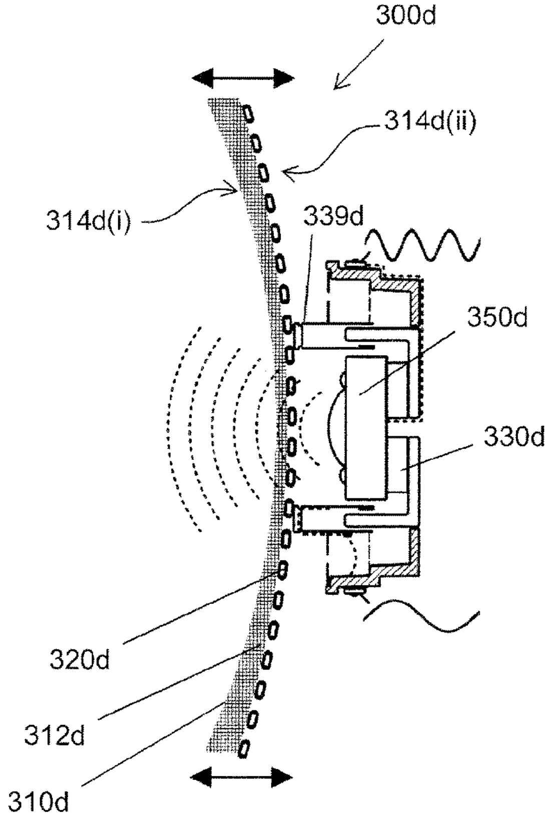

For the dipole loudspeaker 300*d* shown in FIG. 5D, the diaphragm 310*d* is curved to improve geometric stiffness, and the layer 312*c* of porous material has a non-uniform thickness, and thus the layer 312*c* has variable specific airflow resistance across the layer 312*c*. Nonetheless, the continually varying thickness of the layer 312*c* is preferably chosen such that the specific airflow resistance of the layer 312*c* (or at least part of the layer 312*c*) is in the range 5-5000 Pa·s/m, more preferably in the range 50-500 Pa·s/m, if measured in accordance with ISO 9053, e.g. as discussed below (under "Airflow resistance measurements").

The dipole loudspeaker 300*a* shown in FIG. 5A does not include a supplementary loudspeaker.

The dipole loudspeaker 300*b* shown in FIG. 5B has a supplementary (mid-high frequency) loudspeaker 350*b* mounted adjacent to the drive unit 330*b*.

The dipole loudspeakers 300*c*, 300*d* shown in FIGS. 5C-D each have a supplementary (mid-high frequency) loudspeaker 350*c*, 350*d* mounted in the drive unit 330*c*, 330*d*.

In all cases where a supplementary loudspeaker 350*b*, 350*b*, 350*d* is present, the supplementary loudspeaker 350*b*, 350*b*, 350*d* is configured to produce sound which propagates through a part of the layer 312*b*, 312*c*, 312*d* of porous material that airflow is permitted to flow through.

We note there that the drive units 330*a-d* of the dipole loudspeakers 300*a-d* are constructed in a similar manner to the inertial exciters described in PCT/EP2019/084950. However, unlike the inertial exciters described in PCT/EP2019/084950 (in which a magnet assembly is suspended from a diaphragm via a coil assembly by at least one suspension), the drive units 330*a-d* shown in FIGS. 5A-D are grounded, i.e. intended to be rigidly attached to a frame of the dipole loudspeaker 300*a-d* (the frame of the dipole loudspeaker 300*a-d* is not shown here but is shown for example in FIG. 4A, where a magnet assembly of the drive unit 230*a* is rigidly attached to the frame 240*a* of the first dipole loudspeaker 200*a*). Thus for the drive units 330*a-d* shown in FIGS. 5A-D, a diaphragm 310*a-d* is suspended from a magnet assembly of the drive unit 330*a-d*, rather than the magnet assembly of the drive unit 330*a-d* being suspended from a diaphragm 310*a-d*.

Drive units 330*a-d* having the constructions shown in FIGS. 5A-D are advantageous because they help to provide stable pistonic movement of the diaphragm 310*a-d* and reduce rocking of the diaphragm 310*a-d* when the magnet assembly is rigidly attached to an external body (e.g. frame), i.e. when the drive unit 330*a-d* is "grounded".

Also, drive units 330*a-d* having the constructions shown in FIGS. 5A-D drive are particularly well suited for use in a dipole loudspeaker because they obstruct a smaller area of the second radiating surface 314*a-d*(*ii*) of the diaphragm 310*a-d* compared with other drive unit constructions.

EXPERIMENTS

Experiment 1

Figure 6A:
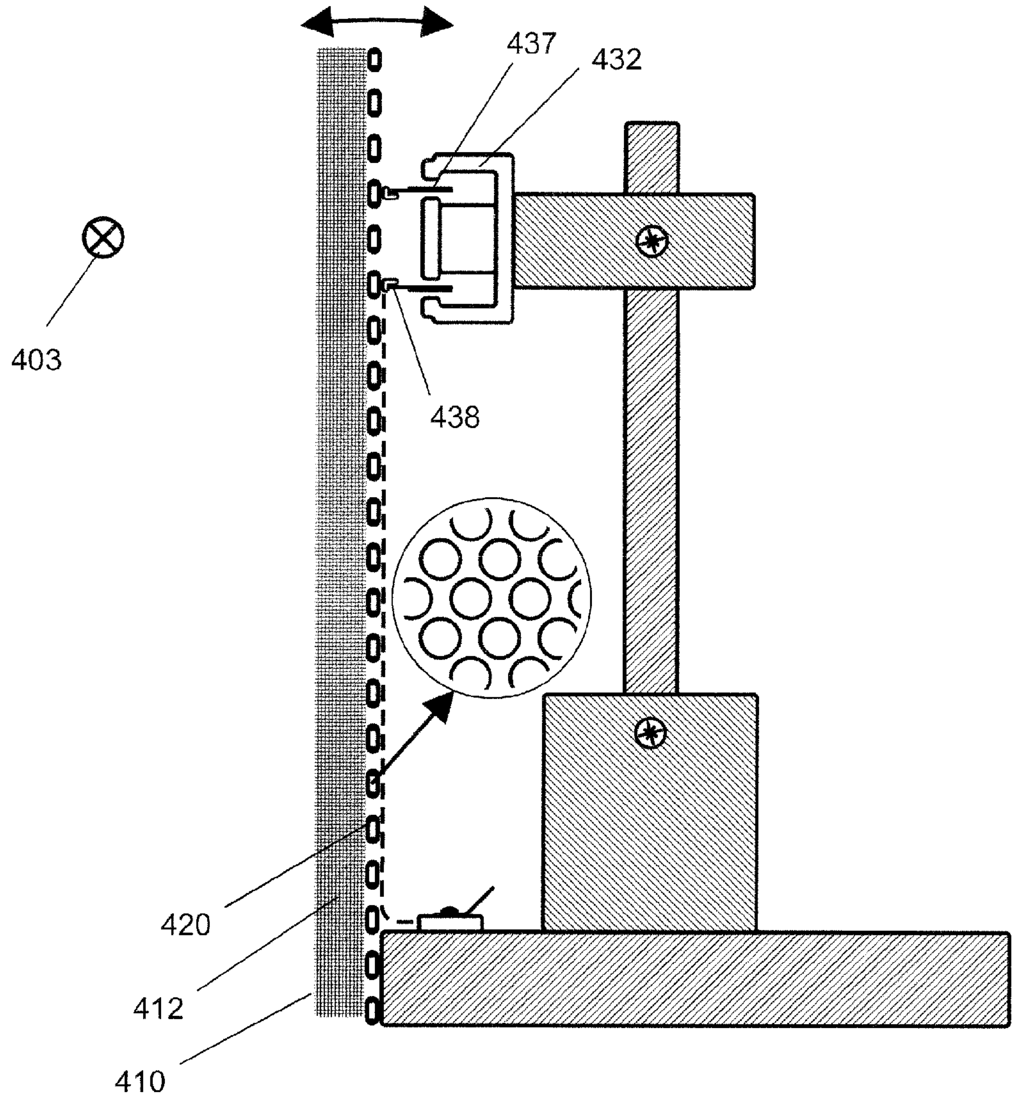
FIGS. 6A-C relate to experiment 1, discussed in more detail below.

FIG. 6A shows an experimental apparatus used for experiment 1.

The experimental apparatus included a diaphragm 410 that included includes a layer 412 of porous material mounted on a supporting structure 420.

The layer 412 of porous material was 10 mm Basotect open cell foam.

Basotect is a trademark from BASF and is an open cell melamine foam with a well-defined flow resistivity of approximately 10 kPa·s/$m^2$. Therefore, it is often used as a reference open cell foam.

The supporting structure 420 was a 2 mm thick aluminium perforated plate having circular holes of diameter 5 mm arranged with a distance of 8 mm centre to centre (see inset circle). The aluminium plate was 32 cm in length, 20 cm wide, and was excited at a nodal line 25 cm from its base via a voice coil 437 mounted to a voice coil former 438 attached to the with a grounded magnet unit 432.

Note: the perforated plate used here is so open in structure, its specific airflow resistance that is close to zero, and therefore it allows airflow through substantially the entire layer 412 of porous material.

The diaphragm 410 was driven using by supplying the voice coil 437 with an electrical signal via a lead wire (note that the lead wire can be conveniently attached to the supporting structure 420), and the resulting SPL measured by the microphone 403.

Measurements were performed in the following conditions:

A. With the layer 412 of porous material absent, and with the perforations in the perforated plate 420 left open ("open plate")

B. With the layer 412 of porous material absent, and with the perforations in the perforated plate 420 taped over with tape ("closed plate")

C. With the layer 412 of porous material present, and with the perforations in the perforated plate 420 left open ("foam+open plate")

Figure 6B:
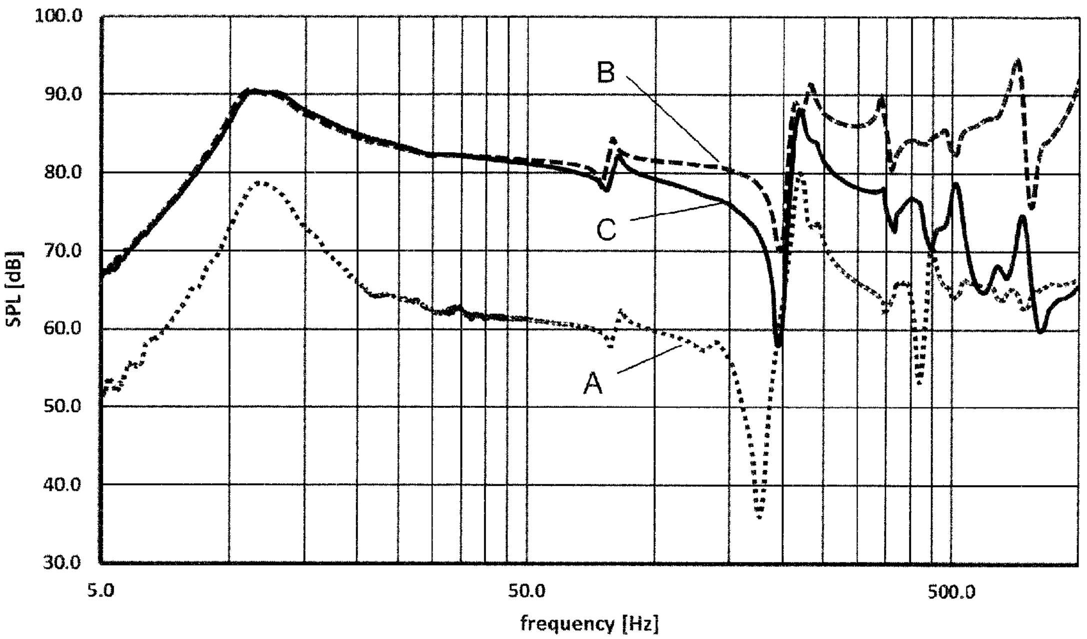

FIG. 6B shows the results of these measurements, with the lines being labelled A, B, C to correspond to the above descriptions.

What this shows is that the diaphragm 410 as shown in FIG. 6A ("foam+open plate"=line C in FIG. 6B) is able to produce SPL at bass frequencies which closely approximate the SPL produced by a non-porous diaphragm ("closed plate"=line B in FIG. 6B), making it well suited for producing a personal sound cocoon at bass frequencies (e.g. when mounted in a car headrest).

Figure 6C:
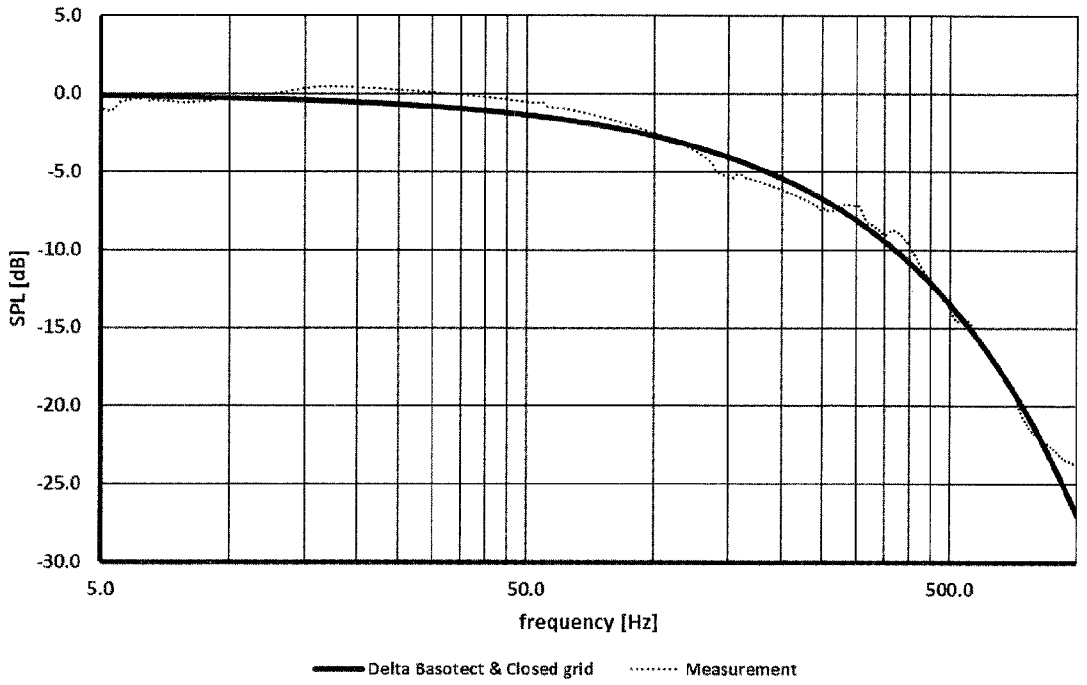

This is also illustrated by FIG. 6C, which shows the measured difference ("delta") between the SPL produced by the "closed plate" and the "foam+open plate" configurations up to 500 Hz (dotted line) as well as a line of best fit for these measurements (solid line). This figure shows that there is an attenuation of ~2.5 dB at 100 Hz for the "foam+open plate" configuration compared with the "closed plate" configuration.

Experiment 2

Figure 7:
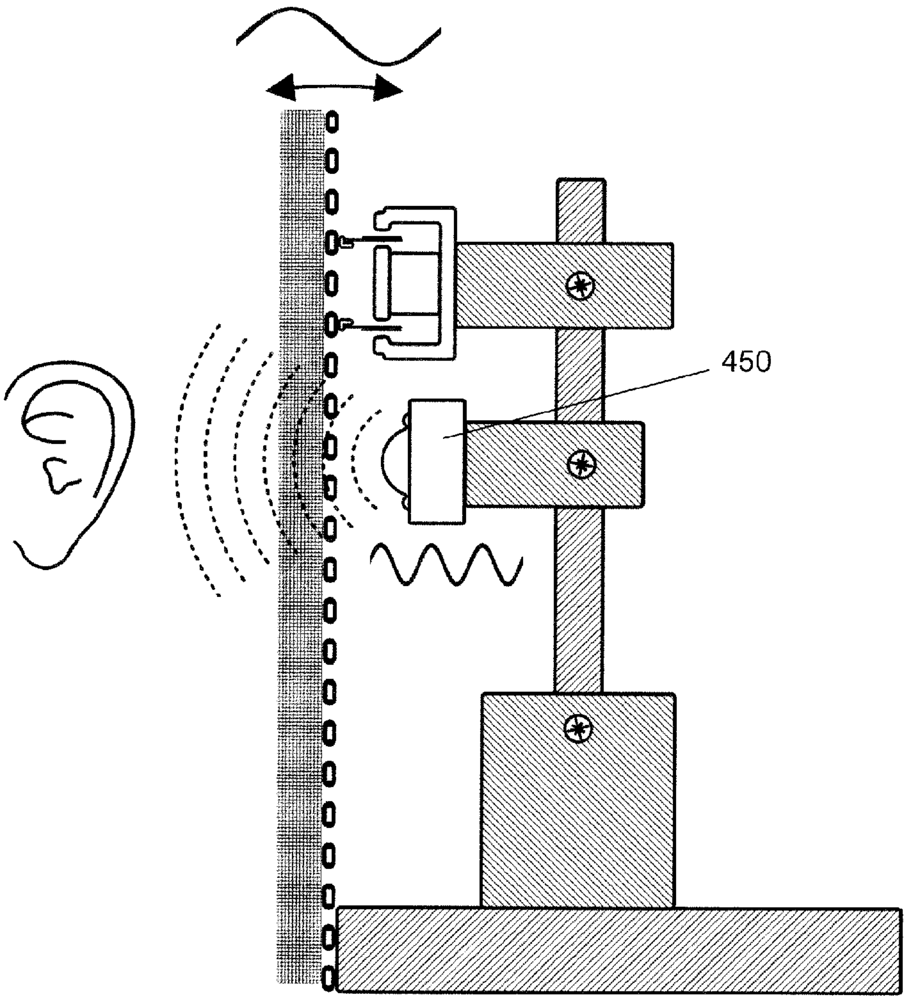
FIG. 7 relates to experiment 2, discussed in more detail below.

FIG. 7 shows an experimental apparatus used for experiment 2.

The experimental apparatus used here is the same as for experiment 1, except that an additional supplementary mid-high frequency loudspeaker 450 was mounted to produce sound which propagates through a part of the layer 412 of porous material that airflow is permitted to flow through via the perforated plate 420.

In this experiment, the diaphragm 410 and supplementary loudspeaker 450 were used to play sound in the bass and mid-high frequencies (respectively), with a person locating their ear so that they could listen to sound produced by the mid-high frequency loudspeaker after this sound had propagated through the layer 412 of porous material (and the supporting structure 420) of the diaphragm 410.

The person listening to this sound reported that the sound was great, that the sound produced in the mid-high frequencies was perceived to be audibly non-affected by the diaphragm 410 and that this sound accompanied the bass output of the diaphragm 410 very well so that a full frequency range performance was achieved without the mid high frequency loudspeaker 450 being seen visually and without it occupying space that serves the production of low frequencies (which requires maximal possible surface area to achieve the required volume displacement to produce large enough SPL at low frequencies).

Experiment 3

Figure 8A:
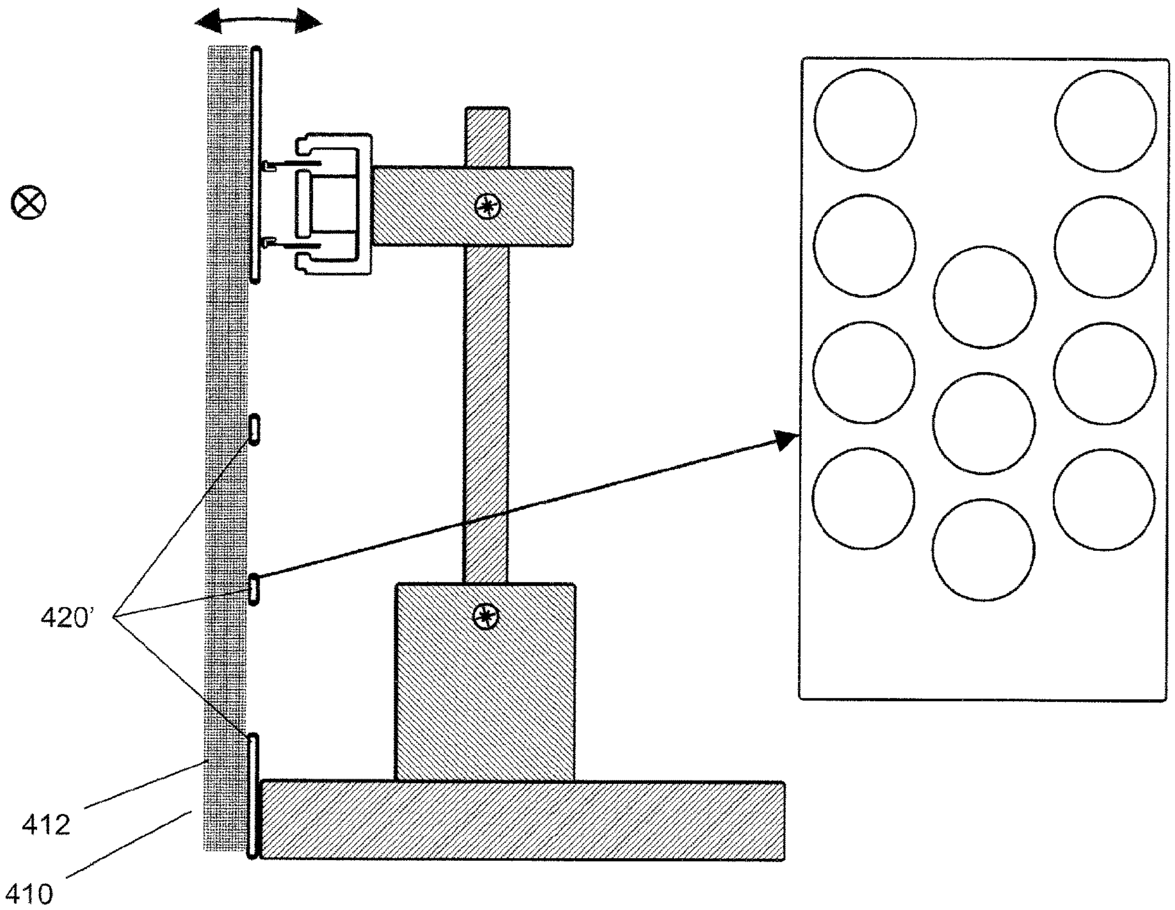
FIGS. 8A-B relate to experiment 3, discussed in more detail below.

FIG. 8A shows an experimental apparatus used for experiment 3.

The experimental apparatus used here is the same as for experiment 1, except that a different perforated plate 420' was used, as shown by the inset rectangle. Here the perforated plate 420' used was 3 mm thick hardboard with irregularly spaced circular holes having a 55 mm diameter.

The plate was again 32 cm in length and 20 cm wide.

Note: the perforated plate 420' used here allows airflow through the parts of the layer 412 of porous material located over and close to the holes, though there may be some parts of the layer 412 (e.g. which are located far away from the holes) through which airflow is not permitted by the perforated plate 420'.

The use of perforated plate 420' was intended to demonstrate that a perforated plate with densely packed small holes are not required to obtain good results, and that good results can still be obtained with very large holes that provide little support and which are unevenly distributed.

In this experiment, measurements were performed with the layer 412 of porous material present, and with the perforations in the perforated plate 420 left open ("foam+open plate"), with the layer 412 of Basotect open cell foam having different thicknesses, including:

A. 10 mm (equating to a specific airflow resistance of around 100 Pa·s/m)

B. 5 mm (equating to a specific airflow resistance of around 50 Pa·s/m)

C. 2.5 mm (equating to a specific airflow resistance of around 25 Pa·s/m)

Measurements were also performed:

D. With the layer 412 of porous material absent, and with the perforations in the perforated plate 420 left open ("open plate")

E. With the layer 412 of porous material absent, and with the perforations in the perforated plate 420 taped over with tape ("closed plate")

Figure 8B:
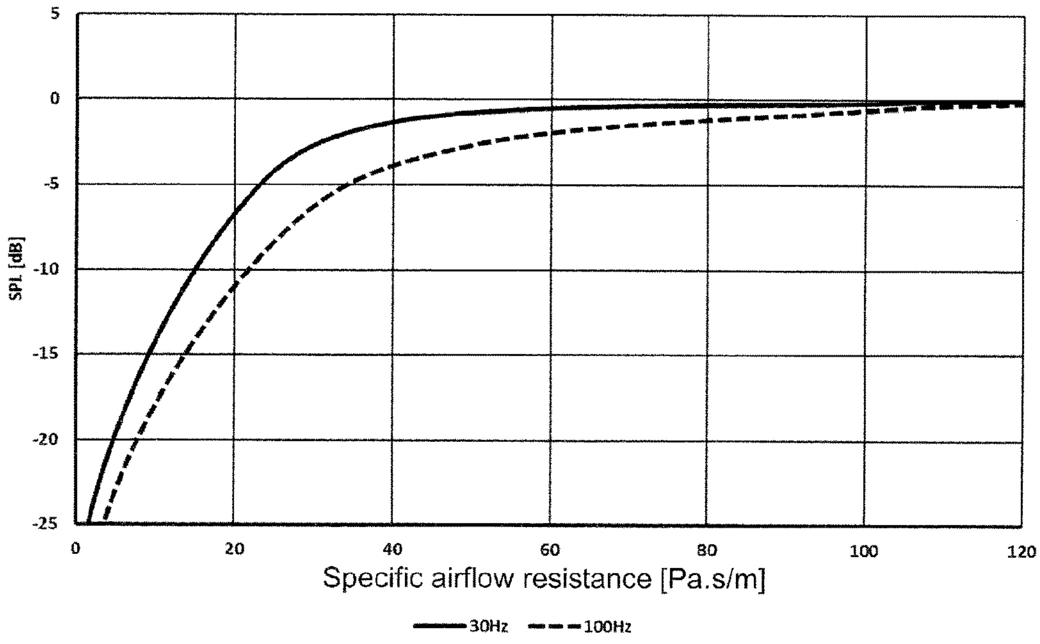

FIG. 8B shows the results of these measurements, with the y-axis indicating the difference in SPL between the "foam+open plate" configuration and the "closed plate" configuration at 30 Hz (solid line) and at 100 Hz (broken line), and with the x-axis indicating the specific airflow resistance of the layer 412 of porous material used in the "foam+open plate" configuration.

This graph shows that increasing specific airflow resistance of the layer 412 of foam results in performance at bass frequencies which gets closer to that of a "closed plate", but that crucially, adequate SPL levels can be produced with relatively low values of specific airflow resistance. For example, a specific airflow resistance of 50 Pa·s/m can achieve near "closed plate" performance at 30 Hz.

Experiment 4

Figure 9A:
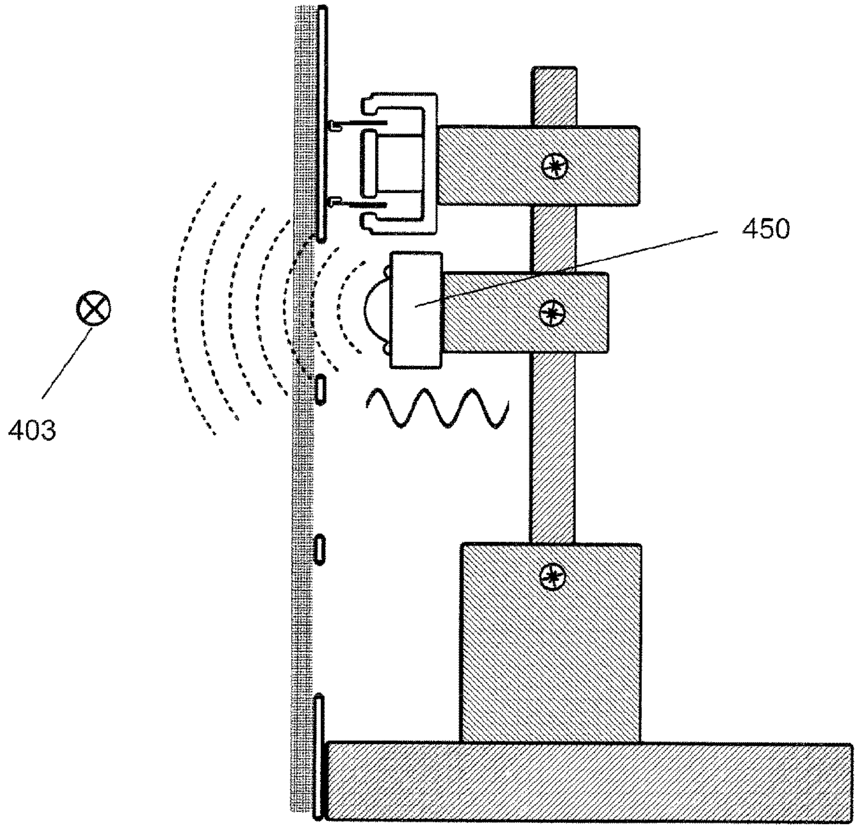
FIGS. 9A-B relate to experiment 4, discussed in more detail below.

FIG. 9A shows an experimental apparatus used for experiment 4.

The experimental apparatus used here is the same as for experiment 3, except that an additional supplementary mid-high frequency loudspeaker 450 was mounted behind a hole in the perforated plate 420' so that sound produced by the supplementary loudspeaker 450 propagates through part of the layer 412 of porous material that airflow is permitted to flow through via the hole in the perforated plate 420'.

The microphone was here mounted at 10 cm from supplementary loudspeaker 450.

Measurements were performed in the following conditions:

A. With the layer 412 of porous material absent, and with the perforations in the perforated plate 420 left open ("open plate")

B. With the layer 412 of porous material present (5 mm thick Basotect), and with the perforations in the perforated plate 420 left open ("foam+open plate")

Figure 9B:
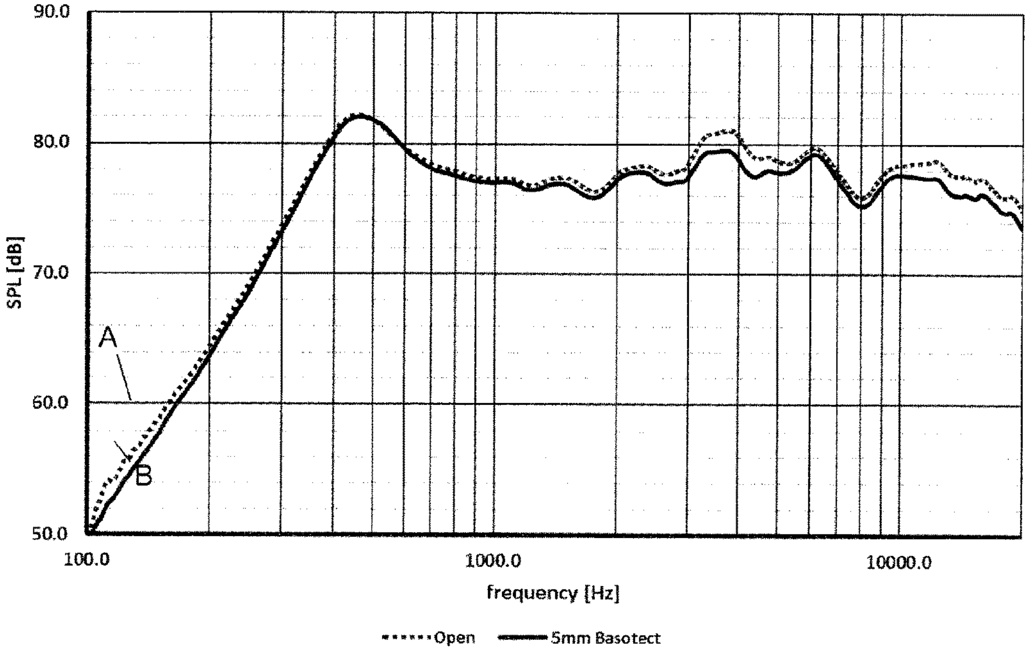

FIG. 9B shows the results of these measurements, with the lines being labelled A, B to correspond to the above descriptions.

What this shows is that a SPL performance in mid-high frequencies, whilst being attenuated by a small amount, is not significantly affected by the presence of the layer 412 of porous material, noting that whilst SPL is slightly decreased when the layer 412 of porous material is present (solid line B), the attenuation is roughly the same across all frequencies, and thus a user's listening experience would not be badly affected.

A skilled person would appreciate that the extent of attenuation caused by the layer 412 of porous material would dependent on the thickness of this layer and the material chosen (see below discussion relating to measuring specific airflow resistance).

It can be seen from experiments 1-4 that there is a balance between making the specific airflow resistance of the layer 412 thick enough to produce adequately high SPL levels at bass frequencies, but not so thick that performance of the loudspeaker is compromised (either by making the diaphragm too heavy, or by causing too much attenuation of mid-high frequencies of a supplementary loudspeaker, if present).

Airflow Resistance Measurements

Measurement Technique

SO 9053 sets out standard methods (Method A or Method B) for conducting airflow measurements to measure Airflow Resistance—R [Pa·s/m$^3$], Specific Airflow Resistance—Rs [Pa·s/m], and Airflow Resistivity—r [Pa·s/m$^2$] for a material sample having a given surface area (S) and thickness (t).

Figure 10A:
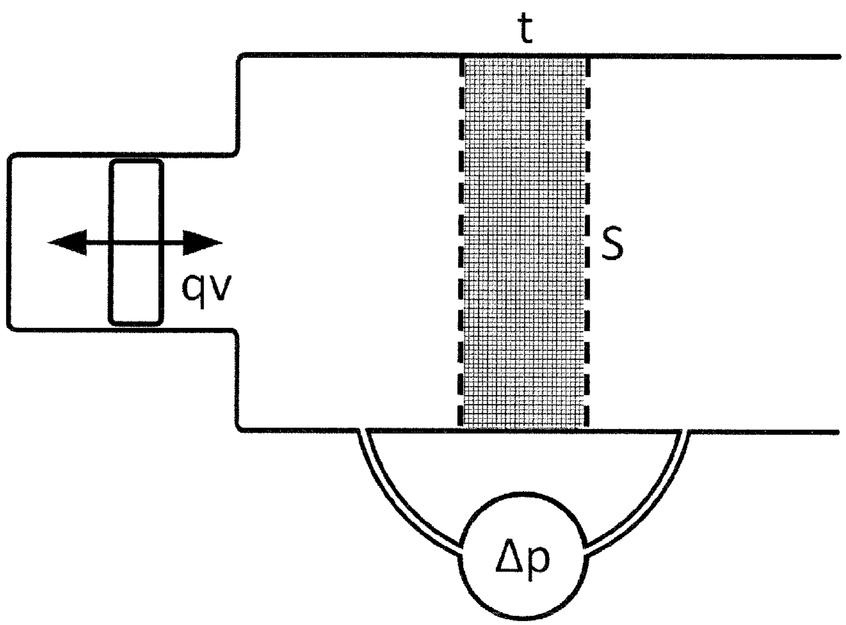
FIGS. 10A-B relate to airflow resistant measurements, discussed in more detail below.

FIG. 10A shows an experimental apparatus that can be used to perform measurements in accordance with ISO 9053 (Method B). Here, a material sample having surface area (S) and uniform thickness (t) is placed between two rigid supports (dashed lines) that are very open (at least 50%) and that therefore have negligible specific airflow resistance.

In accordance with ISO 9053, Airflow Resistance—R [Pa·s/m$^3$]—of a material sample gives an actual measured material sample flow resistance that is dependent on the surface area (S) of the sample.

Using the experimental apparatus shown in FIG. 10A and in accordance with ISO 9053 (Method B), a value of R can be obtained using the relation:

$$R = \frac{\Delta p}{q_V} \qquad [1]$$

Where Δp is pressure difference across the sample [Pa] and qv is volumetric airflow rate [m$^3$/s].

Specific Airflow Resistance—Rs [Pa·s/m]—of a material sample gives an indication of sample flow resistance that is independent of the surface area (S).

In accordance with ISO 9053, a value of Rs can be obtained by multiplying R by the surface area of the measured sample [m$^2$]:

$$R_S = R \cdot S \qquad [2]$$

Airflow Resistivity—r [Pa·s/m$^2$]—of a material sample gives an indication of sample flow resistance that is independent of the surface area (S) and thickness (t).

In accordance with ISO 9053 is obtained by dividing Rs by the thickness t [m] of the sample:

$$r = \frac{R_s}{t} \qquad [3]$$

The present disclosure sometimes makes reference to a region of porous material having a specific airflow resistance in a defined range of values (e.g. a region of porous material having a specific airflow resistance in the range 5-5000 Pa·s/m).

This region of porous material may be the entirety of, or a part of, a layer of porous material.

If a region of porous material (that is the entirety of, or a part of, a layer of porous material) has a uniform thickness t in a thickness direction (where the thickness direction may be taken as being locally perpendicular to the surface of the layer), then the specific airflow resistance of that region may be straightforwardly be calculated using the equation [3], rewritten as:

$$R_s = r \cdot t \qquad [4]$$

However, as can be seen from FIGS. 4A and 5D, a layer of porous material may have a non-uniform thickness, e.g. the thickness of the layer of porous material may continuously vary across the surface of the layer of porous material.

If a region of porous material (that is the entirety of, or a part of, a layer of porous material) has a non-uniform thickness t in a thickness direction (where the thickness direction may be taken as being locally perpendicular to the surface of the layer), then a maximum thickness $t_{max}$ of the layer and a minimum thickness $t_{max}$ of the layer in that region should be obtained, and a maximum and minimum value of the specific airflow resistance are obtained by inserting the values of $t_{max}$, $t_{min}$ in equation [4]. If these maximum and minimum values of specific airflow resistance fall within the defined range of values (e.g. 5-5000 Pa·s/m), then the region of porous material can be deemed to have a specific airflow resistance falling within the defined range of values.

Similarly, if a region of porous material (that is the entirety of, or a part of, a layer of porous material) has a non-uniform resistivity r, then an average value of the resistivity (e.g. averaged over the volume of the material in the region) should be used to determine whether the region of porous material has a specific airflow resistance falling within the defined range of values.

Note, if the region of porous material is defined as being only a part of a layer of porous material, then the part of the layer of porous material should include the full extent of the porous material in a thickness direction of the layer. In other words, the region of porous material should not be defined to include only part of a layer of porous material in a thickness direction of the layer.

Measurement Results

The following tables set out airflow measurement results obtained by the inventors in accordance with ISO 9053 (Method B) with a surface area (S) of 72 $cm^2$ for Basotect foam (Table 1) and polyurethane ("PU") foam (Table 2):

TABLE 1

Airflow measurements results for Basotect foam (10 kg/m3)

| Thickness [mm] | 5.5 | 10 | 20 | 32 | 50 |
|---|---|---|---|---|---|
| Flow Resistance [Pa · s/$m^3$] | 9046 | 12961 | 29607 | 44985 | 70615 |
| Specific Flow Resistance [Pa · s/m] | 65 | 94 | 214 | 326 | 511 |
| Flow Resistivity [Pa · s/$m^2$] | 11905 | 9382 | 10715 | 10175 | 10223 |

TABLE 2

Airflow measurements results for PU foam (65 kg/m3)

| Thickness [mm] | 6.5 | 15 |
|---|---|---|
| Flow Resistance [Pa · s/$m^3$] | 17336 | 38421 |
| Specific Flow Resistance [Pa · s/m] | 125 | 278 |
| Flow Resistivity [Pa · s/$m^2$] | 19304 | 18540 |

Figure 10B:
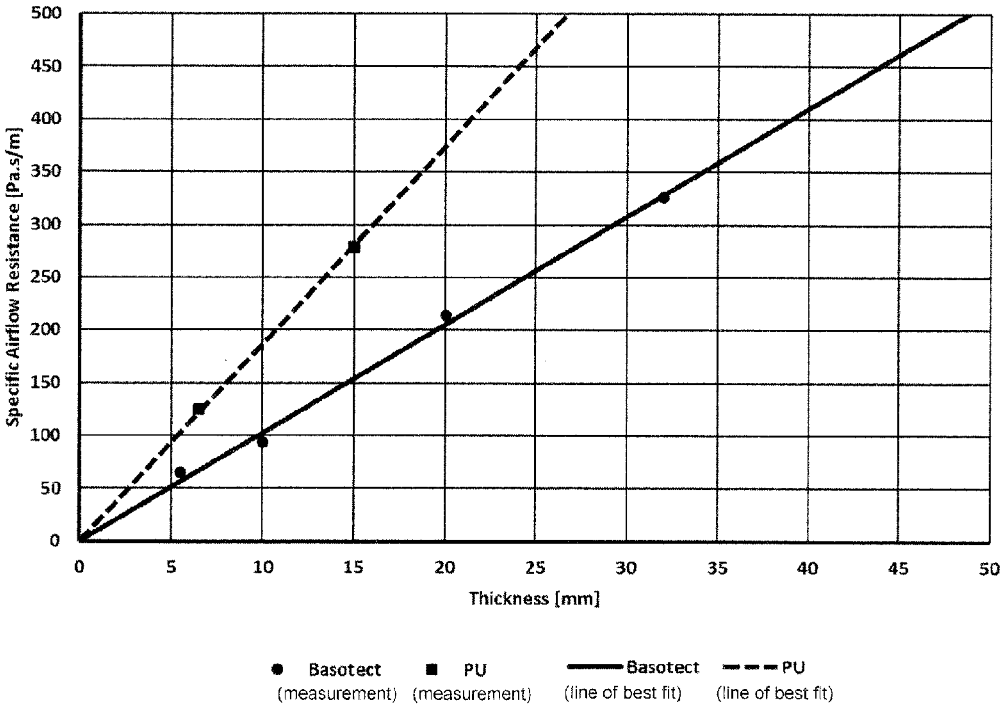

FIG. 10B shows a plot of these measurements, and demonstrates that specific airflow resistance is linearly related to thickness for a given material, noting that an Rs of 100 Pa·s/m can be achieved using only 5 mm thickness of the example PU foam used here, as compared to 10 mm thickness of Basotect (albeit PU foam is considerably heavier).

These results show that a thicknesses of Basotect in the range ~5 mm to ~50 mm, and thicknesses of PU in the range ~2.5 mm to ~25 mm might be useful to obtain a specific airflow resistance in the range 5-5000 Pa·s/m.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

REFERENCES

A number of documents including patent applications are cited above in order to more fully describe and disclose the invention and the state of the art to which the invention pertains. Full citations for these references are provided below. The entirety of each of these references, and any applications which claim priority to them, is incorporated herein.

PCT/EP2018/084636
PCT/EP2019/056109
PCT/EP2019/056352
PCT/EP2019/084950
GB1907267.7
ISO 9053-1:2018 published October 2018

What is claimed is:

1. A dipole loudspeaker for producing sound at bass frequencies, the dipole loudspeaker including:

a diaphragm having a first radiating surface and a second radiating surface, wherein the first radiating surface and the second radiating surface are located on opposite faces of the diaphragm;

a drive unit configured to move the diaphragm at bass frequencies such that the first and second radiating surfaces produce sound at bass frequencies, wherein the sound produced by the first radiating surface is in antiphase with sound produced by the second radiating surface;

a frame, wherein the diaphragm is suspended from the frame via one or more suspension elements, wherein the frame is configured to allow sound produced by the first radiating surface to propagate out from a first side of the dipole loudspeaker and to allow sound produced by the second radiating surface to propagate out from a second side of the dipole loudspeaker;

wherein the diaphragm includes a region of porous material having a specific airflow resistance in the range 50-500 Pa·s/m, wherein the diaphragm is configured to permit airflow through at least part of said region of porous material from the first radiating surface of the diaphragm to the second radiating surface of the diaphragm.

2. A dipole loudspeaker according to claim 1, wherein the dipole loudspeaker is configured for use with an ear of a user located at a listening position that is in front of and 30 cm or less from the first radiating surface of the diaphragm.

3. A dipole loudspeaker according to claim 1, wherein the diaphragm includes a layer of porous material mounted on a supporting structure.

4. A dipole loudspeaker according to claim 3, wherein the supporting structure is a rigid perforated sheet of non-porous material, wherein the sheet includes a plurality of holes/cut-outs.

5. A dipole loudspeaker according to claim 4, wherein the plurality of holes/cut-outs having an area that is 50% or more of the area of the sheet when the holes/perforations are covered.

6. A dipole loudspeaker according to claim 3, wherein a lead wire configured to supply electrical energy to a voice coil of the drive unit is mounted to the supporting structure.

7. A dipole loudspeaker according to claim 1, wherein the diaphragm is an unsupported layer of porous material.

8. A dipole loudspeaker according to claim 1, wherein the dipole loudspeaker includes a supplementary loudspeaker configured to produce sound which propagates through the at least part of said region of porous material.

9. A dipole loudspeaker according to claim 8, wherein the supplementary loudspeaker is a mid-high frequency loudspeaker configured to produce sound across at least the range 500 Hz-10 kHz.

10. A dipole loudspeaker according to claim 1, wherein the drive unit is rigidly attached to the frame of the dipole loudspeaker.

11. A seat assembly including a seat and a dipole loudspeaker for producing sound at bass frequencies, the dipole loudspeaker including:

a diaphragm having a first radiating surface and a second radiating surface, wherein the first radiating surface and the second radiating surface are located on opposite faces of the diaphragm;

a drive unit configured to move the diaphragm at bass frequencies such that the first and second radiating surfaces produce sound at bass frequencies, wherein the sound produced by the first radiating surface is in antiphase with sound produced by the second radiating surface;

a frame, wherein the diaphragm is suspended from the frame via one or more suspension elements, wherein the frame is configured to allow sound produced by the first radiating surface to propagate out from a first side of the dipole loudspeaker and to allow sound produced by the second radiating surface to propagate out from a second side of the dipole loudspeaker;

wherein the diaphragm includes a region of porous material having a specific airflow resistance in the range 50-500 Pa·s/m, wherein the diaphragm is configured to permit airflow through at least part of said region of porous material from the first radiating surface of the diaphragm to the second radiating surface of the diaphragm;

wherein the seat is configured to position a user who is sat down in the seat such that an ear of the user is located at a listening position that is in front of and 30 cm or less from the first radiating surface of the diaphragm.

12. A seat assembly including claim 11, wherein the dipole loudspeaker is mounted within a headrest of the seat.

13. A seat assembly according to claim 12, wherein the headrest includes a headrest material which at least partially encloses the dipole loudspeaker, wherein the headrest material which encloses the dipole loudspeaker is a porous material having a specific airflow resistance of less than 25 Pa·s/m.

14. A seat assembly according to claim 11, wherein the headrest includes two of the dipole loudspeakers, wherein the seat is configured to position a user who is sat down in the seat such that a first ear of the user is located at a listening position that is in front of and 30 cm or less from the first radiating surface of the diaphragm of a first of the two dipole loudspeakers, and such that a second ear of the user is located at a listening position that is in front of and 30 cm or less from the first radiating surface of the diaphragm of a second of the two dipole loudspeakers.

* * * * *